US012647434B2

(12) United States Patent
Woodlee et al.

(10) Patent No.: US 12,647,434 B2
(45) Date of Patent: Jun. 2, 2026

(54) SYSTEMS AND METHODS FOR REAL-TIME GENERATION AND EXECUTION OF COMPUTER-EXECUTABLE INVESTIGATIVE QUERIES IN A CYBERSECURITY EVENT DETECTION AND RESPONSE PLATFORM

(71) Applicant: Expel, Inc., Herndon, VA (US)

(72) Inventors: Malachi Woodlee, Burtonsville, MD (US); Brady Stouffer, Monrovia, MD (US)

(73) Assignee: Expel, Inc., Herndon, VA (US)

( * ) Notice: Subject to any disclaimer, the term of this patent is extended or adjusted under 35 U.S.C. 154(b) by 0 days.

(21) Appl. No.: 19/304,982

(22) Filed: Aug. 20, 2025

(65) Prior Publication Data

US 2026/0081934 A1 Mar. 19, 2026

Related U.S. Application Data

(60) Provisional application No. 63/795,671, filed on Apr. 28, 2025, provisional application No. 63/694,491, filed on Sep. 13, 2024.

(51) Int. Cl.
*H04L 29/06* (2006.01)
*H04L 9/40* (2022.01)
*H04L 61/4511* (2022.01)

(52) U.S. Cl.
CPC ...... *H04L 63/1416* (2013.01); *H04L 61/4511* (2022.05)

(58) Field of Classification Search
None
See application file for complete search history.

(56) References Cited

U.S. PATENT DOCUMENTS

| | | | | |
|---|---|---|---|---|
| 11,777,970 B1* | 10/2023 | Wainer | ............... | G06F 18/2415 |
| | | | | 726/23 |
| 11,853,415 B1* | 12/2023 | Wainer | ..................... | G06N 7/01 |
| 12,381,897 B2* | 8/2025 | Whalen | ................. | G06F 21/566 |
| 12,387,118 B1* | 8/2025 | Wainer | ................. | G06F 16/248 |
| 12,388,870 B2* | 8/2025 | Weber | ................. | H04L 63/1483 |
| 2024/0020701 A1* | 1/2024 | Hrabik | ............... | G06Q 20/4016 |
| 2024/0146746 A1* | 5/2024 | Bhatia | ................. | H04L 63/1416 |
| 2024/0356962 A1* | 10/2024 | Hlavac | ............... | H04L 63/1441 |
| 2025/0260707 A1* | 8/2025 | Belgi | ................. | H04L 63/1433 |
| 2025/0260715 A1* | 8/2025 | Reich | ................. | H04L 63/1408 |
| 2025/0317469 A1* | 10/2025 | Thompson | .......... | H04L 63/1433 |
| 2025/0358121 A1* | 11/2025 | Mullaney | .............. | H04L 9/3213 |
| 2025/0358296 A1* | 11/2025 | Ray | ..................... | H04L 63/1416 |
| 2025/0378446 A1* | 12/2025 | Hrabik | .............. | G06Q 20/4016 |
| 2026/0012471 A1* | 1/2026 | Haridas | ............... | H04L 63/1425 |

* cited by examiner

*Primary Examiner* — Jeffery L Williams
(74) *Attorney, Agent, or Firm* — Padowithz Alce; Chandler Scheitlin; Alce PLLC

(57) ABSTRACT

A system, method, and computer-implemented method includes generating a security alert for a subscriber, executing an automated investigation protocol for the security alert, obtaining, in response to executing a first plurality of computer-executable investigation queries and a second plurality of computer-executable investigation queries, a corpus of investigation findings data indicative of whether the security alert corresponds to a security threat or a benign security alert, and displaying, using a graphical user interface, the security alert in association with the corpus of investigation findings data.

20 Claims, 17 Drawing Sheets

100

100

<u>200</u>

Detecting one or more Cybersecurity Alerts <u>S210</u>

Identifying one or more Candidate Query Templates based on the one or more Cybersecurity Alerts <u>S220</u>

Constructing one or more Investigative Query Tasks based on the one or more Candidate Query Templates <u>S230</u>

Executing one or more Investigative Queries based on the one or more Investigative Query Tasks <u>S240</u>

Surfacing Alert Context Data based on the one or more Investigative Queries <u>S250</u>

FIG. 2

Vendor-Specific Query Template alert_name:

plugin: plugin_name capability: capability_name input_arguments:

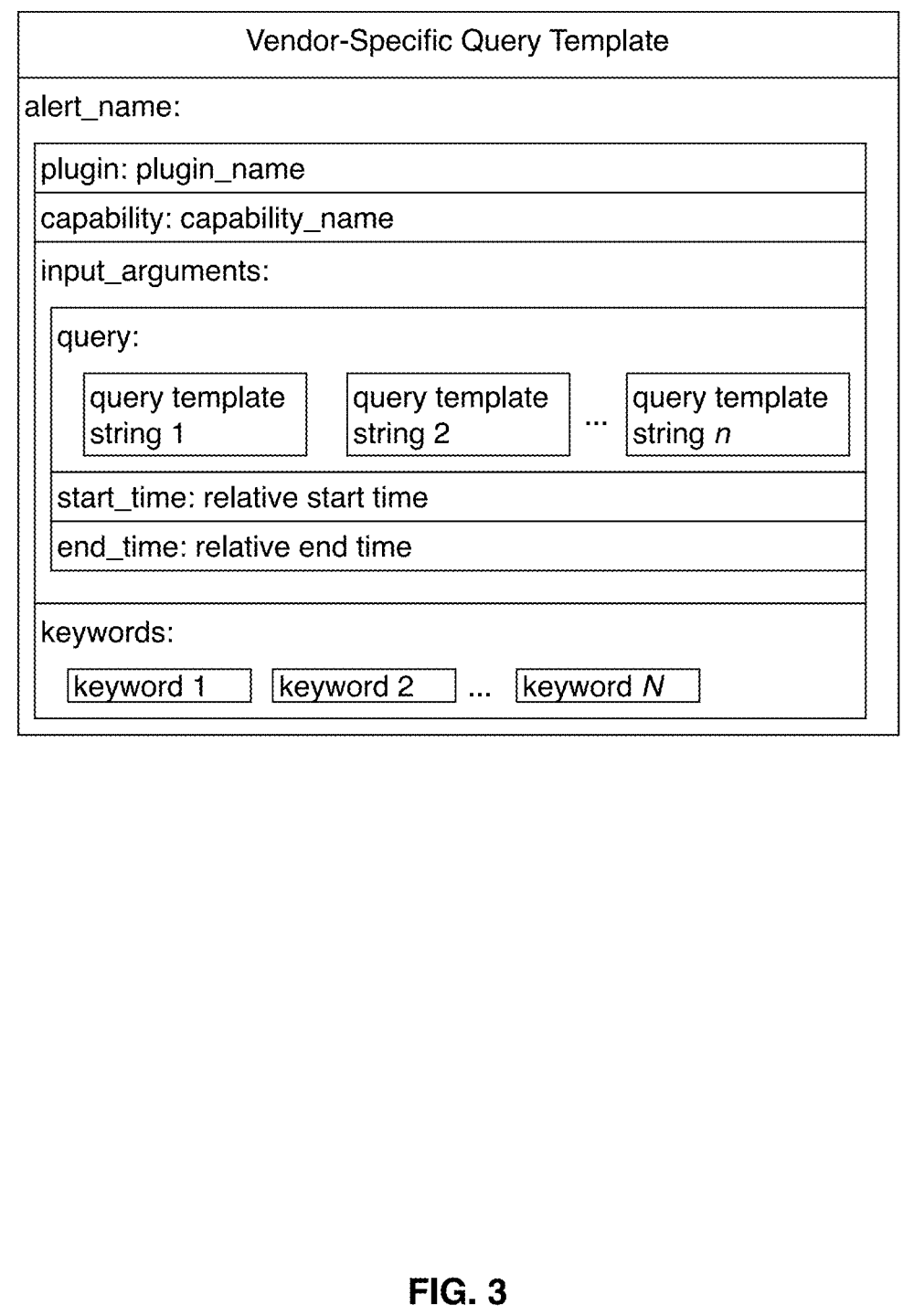

query:

| query template string 1 | query template string 2 | ... | query template string n | start_time: relative start time end_time: relative end time keywords:

| keyword 1 | keyword 2 | ... | keyword N |

FIG. 3

Customer-Specific Query Template alert_name:

vendor sub-template 1 vendor sub-template 2

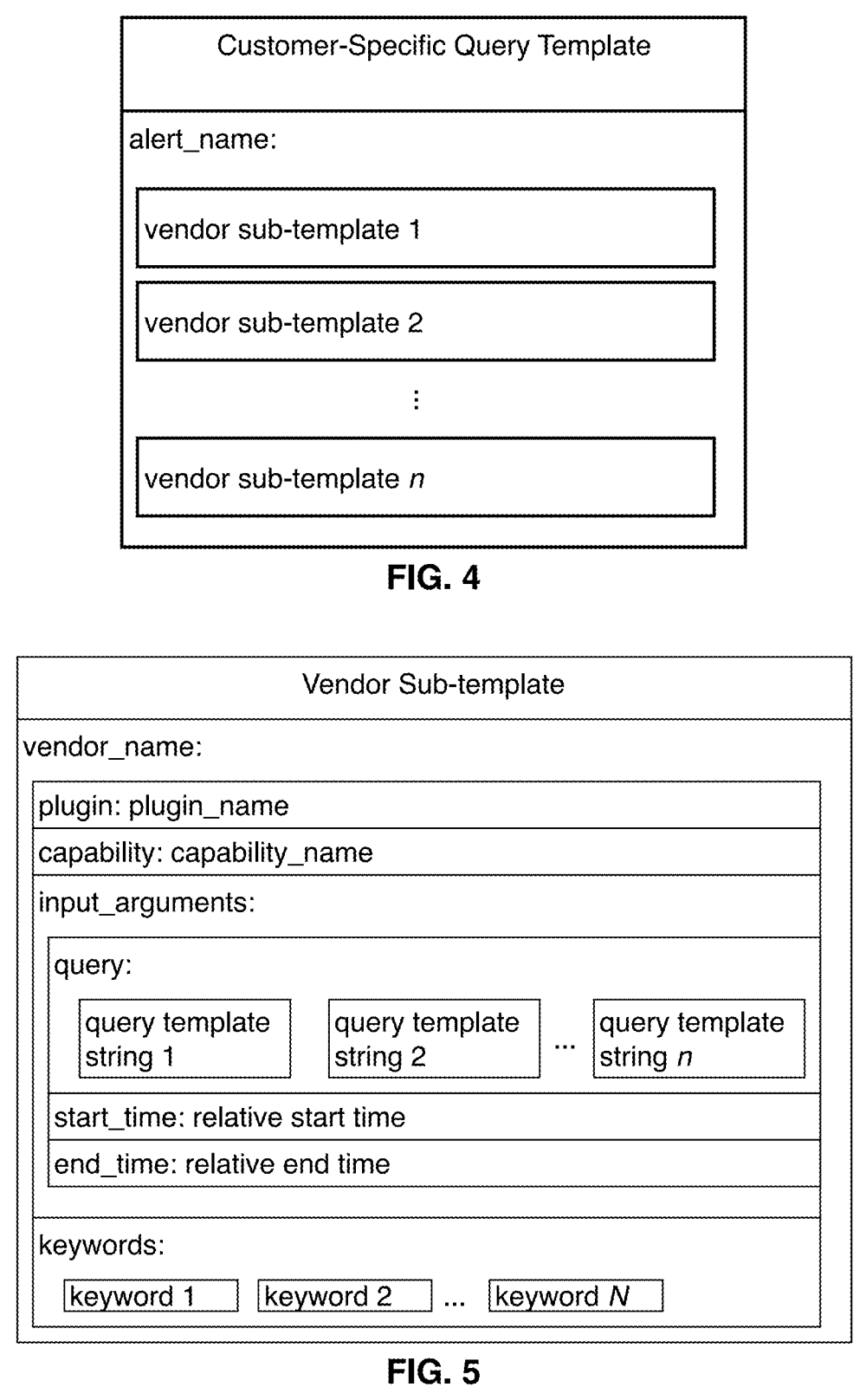

⋮ vendor sub-template *n*

FIG. 4

Vendor Sub-template vendor_name:

plugin: plugin_name capability: capability_name input_arguments:

query:

| query template string 1 | query template string 2 | ··· | query template string *n* | start_time: relative start time end_time: relative end time keywords:

keyword 1    keyword 2    ...    keyword *N*

FIG. 5

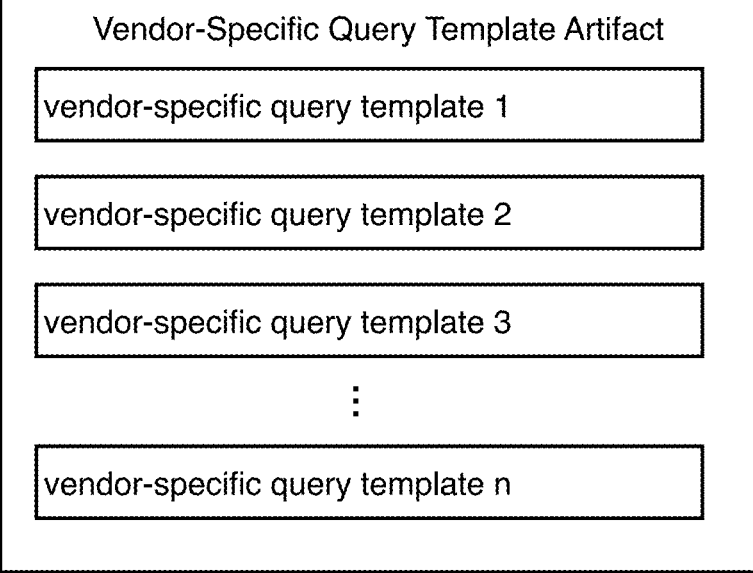

FIG. 6A

Vendor-Specific Query Template Artifact vendor-specific query template 1 vendor-specific query template 2 vendor-specific query template 3

⋮ vendor-specific query template n

Customer-Specific Query Template Artifact customer-specific query template 1 customer-specific query template 2 customer-specific query template 3

⋮ customer-specific query template n

FIG. 6B

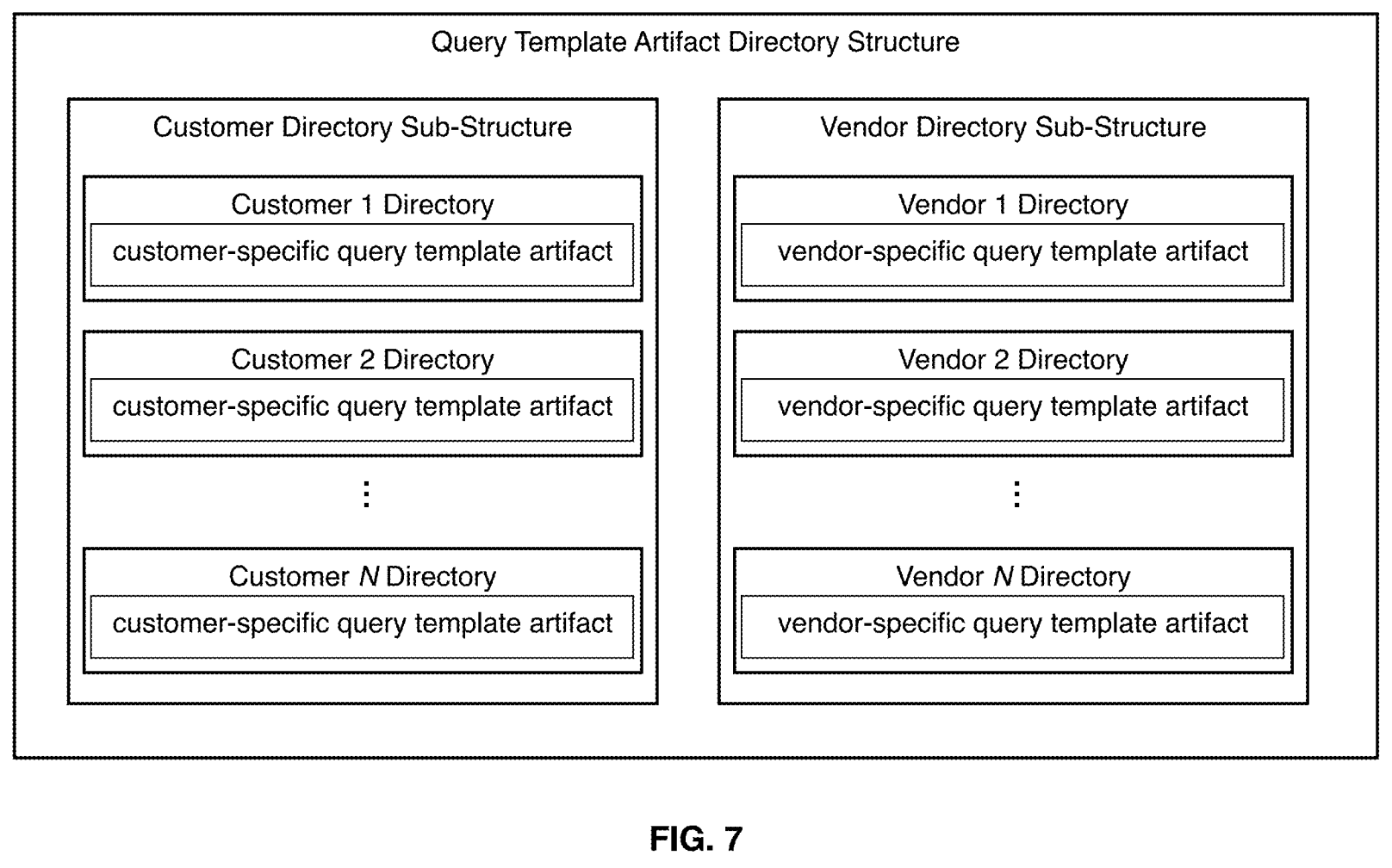

Query Template Artifact Directory Structure

Vendor Directory Sub-Structure

Vendor 1 Directory
vendor-specific query template artifact

Vendor 2 Directory
vendor-specific query template artifact

...

Vendor N Directory
vendor-specific query template artifact

Customer Directory Sub-Structure

Customer 1 Directory
customer-specific query template artifact

Customer 2 Directory
customer-specific query template artifact

...

Customer N Directory
customer-specific query template artifact

FIG. 7

Rendered Argument Construct query: rendered query string start_time: start timestamp end_time: end timestamp

FIG. 10A

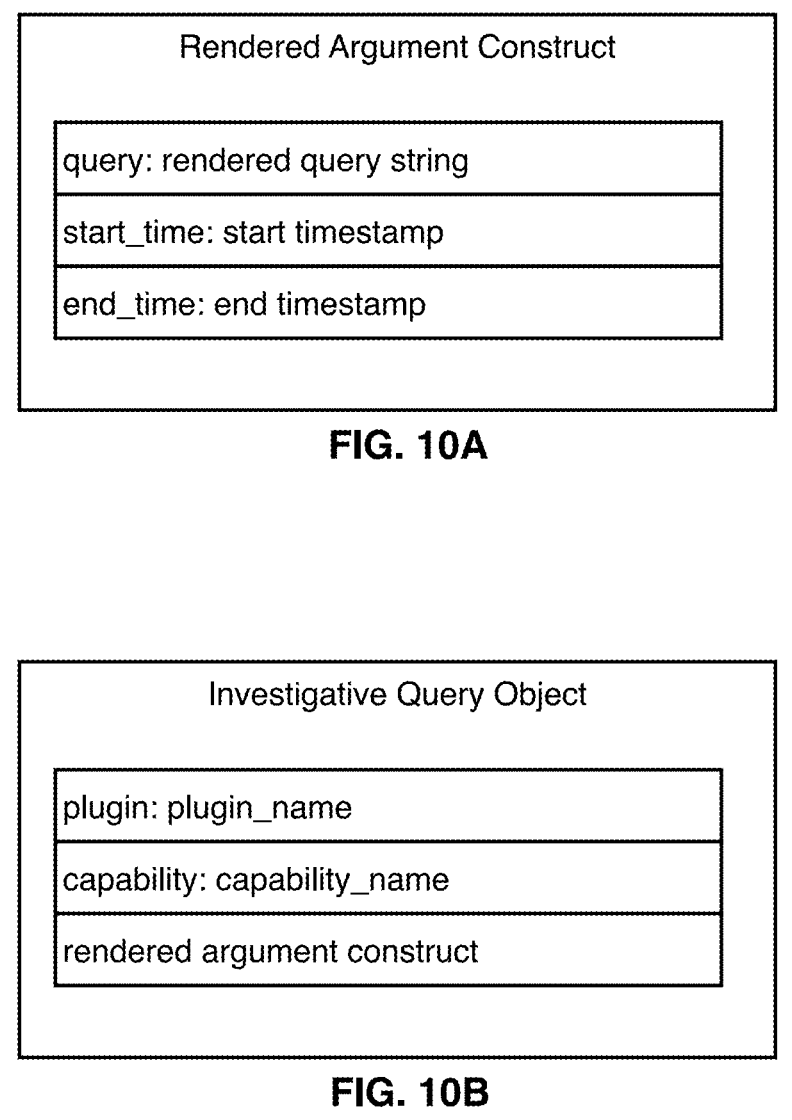

Investigative Query Object plugin: plugin_name capability: capability_name rendered argument construct

FIG. 10B

What region does user@example.com typically login from?

Reason

Robotic Action

Investigative Query 1 of X

| Initial Occurrence | Latest Occurrence | Region | Count | Percent Use |
|---|---|---|---|---|
| 2022-04-20 15:26:11.190000+00:00 | 2022-05-18 17:23:12.093000+00:00 | San Rafael, California, 94903 US | 8 | 1 |
| 2022-04-19 14:20:22.291000+00:00 | 2022-05-18 16:13:27.024000+00:00 | Alexandria, Virginia, 22314 | 67 | 16 |
| 2022-04-19 03:19:53.268000+00:00 | 2022-05-18 04:23:50.334000+00:00 | Arlington, Virginia, 22203 US | 42 | 10 |
| 2022-04-20 12:35:51.166000+00:00 | 2022-05-18 15:22:05.546000+00:00 | Leesburg, Virginia, 20176 US | 30 | 7 |
| 2022-04-20 16:14:03.464000+00:00 | 2022-05-11 19:48:29.275000+00:00 | San Diego, California, 92131 US | 28 | 28 |
| 2022-04-18 19:02:00.661000+00:00 | 2022-05-17 20:04:14.198000+00:00 | Augusta, Georgia, 30901 US | 22 | 22 |

FIG. 13

GENERATING A SECURITY ALERT FOR A SUBSCRIBER IN RESPONSE TO ASSESSING DIGITAL ACTIVITY THAT OCCURRED ON A DIGITAL ASSET OF THE SUBSCRIBER

EXECUTING AN AUTOMATED INVESTIGATION PROTOCOL FOR THE SECURITY ALERT IN RESPONSE TO PROVIDING, AS INPUT, THE SECURITY ALERT TO THE AUTOMATED INVESTIGATION PROTOCOL, WHEREIN EXECUTING THE AUTOMATED INVESTIGATION PROTOCOL INCLUDES:

AUTOMATICALLY EXTRACTING, FROM THE SECURITY ALERT, AN ALERT IDENTIFIER OF THE SECURITY ALERT, A THIRD-PARTY SERVICE THAT DETECTED THE DIGITAL ACTIVITY, AND A GLOBALLY UNIQUE IDENTIFIER (GUID) THAT CORRESPONDS TO THE SUBSCRIBER

AUTOMATICALLY DETECTING THAT (I) A FIRST DIRECTORY PATH COMPRISING THE GUID EXISTS WITHIN A HIERARCHICAL FILE SYSTEM AND (II) A SECOND DIRECTORY PATH COMPRISING A NAME OF THE THIRD-PARTY SERVICE EXISTS WITHIN THE HIERARCHICAL FILE SYSTEM

IN RESPONSE TO DETECTING THE FIRST DIRECTORY PATH AND THE SECOND DIRECTORY PATH EXIST WITHIN THE HIERARCHICAL FILE SYSTEM, AUTOMATICALLY LOADING, INTO MEMORY, A SUBSCRIBER-SPECIFIC INVESTIGATIVE QUERIES FILE LOCATED WITHIN THE FIRST DIRECTORY PATH AND A SERVICE-SPECIFIC INVESTIGATIVE QUERIES FILE LOCATED WITHIN THE SECOND DIRECTORY PATH

AUTOMATICALLY EXTRACTING, FROM THE SUBSCRIBER-SPECIFIC INVESTIGATIVE QUERIES FILE LOADED INTO THE MEMORY, A PLURALITY OF SUBSCRIBER-SPECIFIC INVESTIGATIVE QUERY OBJECTS DIGITALLY MAPPED TO THE ALERT IDENTIFIER CORRESPONDING TO THE SECURITY ALERT

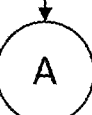

FIG. 14

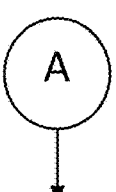

IN RESPONSE TO EXTRACTING THE PLURALITY OF SUBSCRIBER-SPECIFIC INVESTIGATIVE QUERY OBJECTS, AUTOMATICALLY CONSTRUCTING A FIRST PLURALITY OF COMPUTER-EXECUTABLE INVESTIGATION QUERIES USING THE PLURALITY OF SUBSCRIBER-SPECIFIC INVESTIGATIVE QUERY OBJECTS AND A FIRST SUBSET OF EVIDENCE DATA INCLUDED IN THE SECURITY ALERT

↓

AUTOMATICALLY EXTRACTING, FROM THE SERVICE-SPECIFIC INVESTIGATIVE QUERIES FILE LOADED INTO THE MEMORY, A PLURALITY OF SERVICE-SPECIFIC INVESTIGATIVE QUERY OBJECTS DIGITALLY MAPPED TO THE ALERT IDENTIFIER CORRESPONDING TO THE SECURITY ALERT

↓

IN RESPONSE TO EXTRACTING THE PLURALITY OF SERVICE-SPECIFIC INVESTIGATIVE QUERY OBJECTS, AUTOMATICALLY CONSTRUCTING A SECOND PLURALITY OF COMPUTER-EXECUTABLE INVESTIGATION QUERIES USING THE PLURALITY OF SERVICE-SPECIFIC INVESTIGATIVE QUERY OBJECTS AND A SECOND SUBSET OF EVIDENCE DATA INCLUDED IN THE SECURITY ALERT

↓

OBTAINING, IN RESPONSE TO EXECUTING THE FIRST PLURALITY OF COMPUTER-EXECUTABLE INVESTIGATION QUERIES AND THE SECOND PLURALITY OF COMPUTER-EXECUTABLE INVESTIGATION QUERIES, A CORPUS OF INVESTIGATION FINDINGS DATA INDICATIVE OF WHETHER THE SECURITY ALERT CORRESPONDS TO A SECURITY THREAT OR A BENIGN SECURITY ALERT

↓

DISPLAYING, VIA A GRAPHICAL USER INTERFACE, THE SECURITY ALERT IN ASSOCIATION WITH THE CORPUS OF INVESTIGATION FINDINGS DATA

FIG. 14A

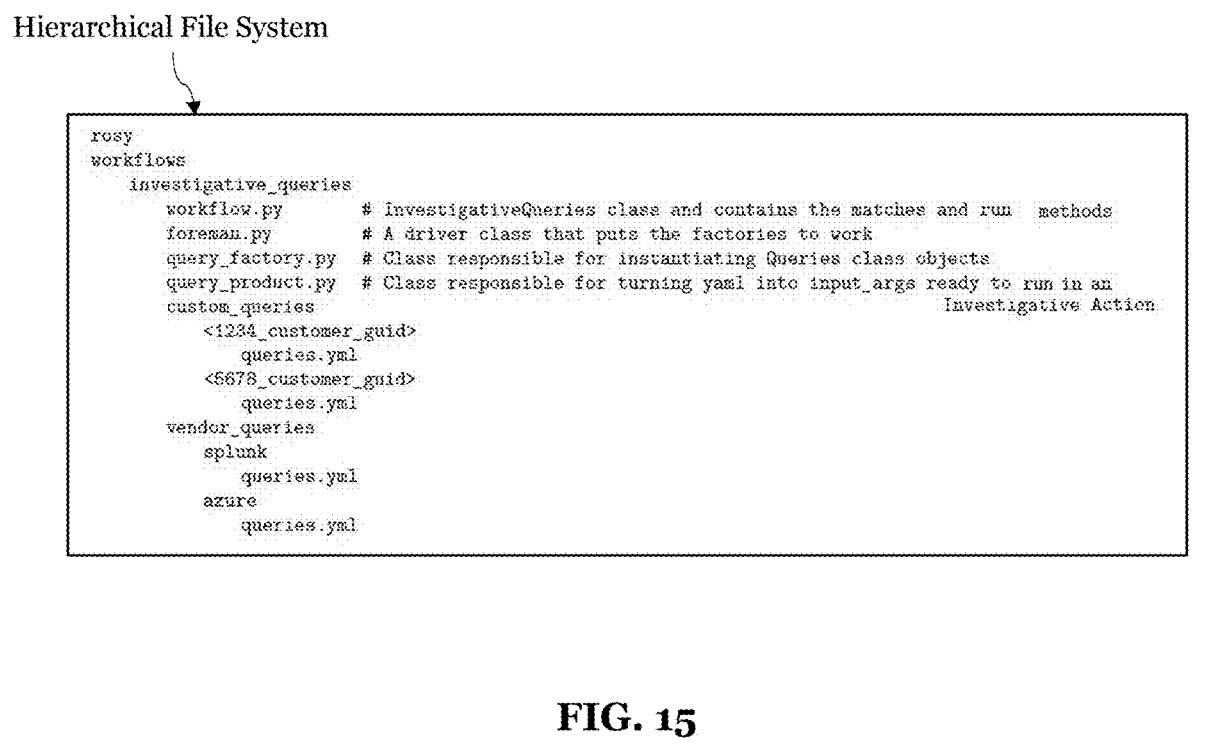

Hierarchical File System

```
rosy
workflows
    investigative_queries
        workflow.py        # InvestigativeQueries class and contains the matches and run   methods
        foreman.py         # A driver class that puts the factories to work
        query_factory.py   # Class responsible for instantiating Queries class objects
        query_product.py   # Class responsible for turning yaml into input_args ready to run in an
        custom_queries                                                      Investigative Action
            <1234_customer_guid>
                queries.yml
            <5678_customer_guid>
                queries.yml
        vendor_queries
            splunk
                queries.yml
            azure
                queries.yml
```

FIG. 15

First Hierarchical Data Schema

```
'Alert Name':
  vendor:

plugin: vendor:1.0.0
    capability: capability_name
    input_args:
      query:
        - 'A query using an OR string join {keyword.OR}' # E.G., keyword1 OR keyword2 OR keyword3
        - 'Another query also using an IN string join in ("{keyword.IN}")' # E.G., ("keyword1",
      start_time: depending on the capability, this may be optional
      end_time: depending on the capability, this may be optional
    keywords:
      - keyword
```

FIG. 16

Second Hierarchical Data Schema

```
'Alert 2 Name': # Or ALL instead of alert name
  plugin: vendor:1.0.0
  capability: capability_name
  input_args:
    query:
        - 'A query using an OR string join {keyword.OR}' # E.G., keyword1 OR keyword2 OR keyword3
        - 'Another query also using an IN string join in ("{keyword.IN}")' # E.G., ("keyword1",
    start_time: depending on the capability, this may be optional
    end_time: depending on the capability, this may be optional
  keywords:
    - keyword
```

FIG. 16A

Computer-Executable
Investigative Query

```
'Alert Name':
  qradar:
    plugin: qradar:1.0.0
    capability: ariel_search
    input_args:
      query:
        - 'select field from events where username IN ("{keyword.IN}") last 1 hour'
    keywords:
      - keyword
```

FIG. 16B

SYSTEMS AND METHODS FOR REAL-TIME GENERATION AND EXECUTION OF COMPUTER-EXECUTABLE INVESTIGATIVE QUERIES IN A CYBERSECURITY EVENT DETECTION AND RESPONSE PLATFORM

CROSS-REFERENCE TO RELATED APPLICATIONS

This application claims the benefit of U.S. Provisional Application No. 63/795,671, filed 28 Apr. 2025 and U.S. Provisional Application No. 63/694,491, filed 13 Sep. 2024, which are incorporated in their entireties by this reference.

TECHNICAL FIELD

This invention relates generally to the cybersecurity field, and more specifically to new and useful cyber threat detection and mitigation systems and methods in the cybersecurity field.

BACKGROUND

Modern computing and organizational security have been evolving to include a variety of security operation services that can often abstract a responsibility for monitoring and detecting threats in computing and organizational resources of an organizational entity to professionally managed security service providers outside of the organizational entity. As many of these organizational entities continue to migrate their computing resources and computing requirements to cloud-based services, the security threats posed by malicious actors appear to grow at an incalculable rate because cloud-based services may be accessed through any suitable Internet or web-based medium or device throughout the world.

Thus, security operation services may be tasked with mirroring the growth of these security threats and correspondingly, scaling their security services to adequately protect the computing and other digital assets of a subscribing organizational entity. However, because the volume of security threats may be great, it may present one or more technical challenges in scaling security operations services without resulting in a number of technical inefficiencies that may prevent or slow down the detection of security threats and efficiently responding to detected security threats.

Thus, there is a need in the cybersecurity field to create improved systems and methods for intelligently scaling threat detection capabilities of a security operations service while improving its technical capabilities to efficiently respond to an increasingly large volume of security threats to computing and organizational computing assets. The embodiments of the present application described herein provide technical solutions that address, at least the need described above.

BRIEF SUMMARY OF THE EMBODIMENTS

In one embodiment, a computer-implemented method includes generating a security alert for a subscriber in response to assessing digital activity that occurred on a digital asset of the subscriber; executing an automated investigation protocol for the security alert in response to providing, as input, the security alert to the automated investigation protocol, wherein executing the automated investigation protocol includes: automatically extracting, from the security alert, an alert identifier of the security alert, a third-party service that detected the digital activity, and a globally unique identifier (GUID) that corresponds to the subscriber; automatically detecting that (i) a first directory path comprising the GUID exists within a hierarchical file system and (ii) a second directory path comprising a name of the third-party service exists within the hierarchical file system; in response to detecting the first directory path and the second directory path exist within the hierarchical file system, automatically loading, into memory, a subscriber-specific investigative queries file located within the first directory path and a service-specific investigative queries file located within the second directory path; automatically extracting, from the subscriber-specific investigative queries file loaded into the memory, a plurality of subscriber-specific investigative query objects digitally mapped to the alert identifier corresponding to the security alert; in response to extracting the plurality of subscriber-specific investigative query objects, automatically constructing a first plurality of computer-executable investigation queries using the plurality of subscriber-specific investigative query objects and a first subset of evidence data included in the security alert; automatically extracting, from the service-specific investigative queries file loaded into the memory, a plurality of service-specific investigative query objects digitally mapped to the alert identifier corresponding to the security alert; in response to extracting the plurality of service-specific investigative query objects, automatically constructing a second plurality of computer-executable investigation queries using the plurality of service-specific investigative query objects and a second subset of evidence data included in the security alert; obtaining, in response to executing the first plurality of computer-executable investigation queries and the second plurality of computer-executable investigation queries, a corpus of investigation findings data indicative of whether the security alert corresponds to a security threat or a benign security alert; and displaying, via a graphical user interface, the security alert in association with the corpus of investigation findings data.

In one embodiment, the alert identifier of the security alert corresponds to an alert name of the security alert, the subscriber-specific investigative queries file includes the plurality of subscriber-specific investigative query objects digitally mapped to the alert name of the security alert and a second plurality of subscriber-specific investigative query objects that are not digitally mapped to the alert name of the security alert, the service-specific investigative queries file includes the plurality of service-specific investigative query objects digitally mapped to the alert name of the security alert and a second plurality of service-specific investigative query objects that are not digitally mapped to the alert name of the security alert, and the computer-implemented method further includes: foregoing extracting the second plurality of subscriber-specific investigative query objects from the subscriber-specific investigative queries file based on the second plurality of subscriber-specific investigative query objects not being digitally mapped to the alert name of the security alert, and foregoing extracting the second plurality of service-specific investigative query objects from the service-specific investigative queries file based on the second plurality of service-specific investigative query objects not being digitally mapped to the alert name of the security alert.

In one embodiment, the digital asset corresponds to a computing environment of the subscriber, each subscriber-specific investigative query object included in the subscriber-specific investigative queries file is specifically created to investigate activity occurring within the computing environment of the subscriber that is not detectable by any threat detection rule provided by the third-party service, and each service-specific investigative query object included in the service-specific investigative queries file is operably configured to investigate any security alert having at least one piece of alert metadata referencing the third-party service.

In one embodiment, the alert identifier of the security alert corresponds an alert name of the security alert, the alert name of the security alert does not include any numeric characters, the subscriber-specific investigative queries file is structured according to a hierarchical data schema, wherein the subscriber-specific investigative queries file includes: a root-level object that includes the alert name of the security alert, and a nested object within the root-level object that includes the plurality of subscriber-specific investigative query objects, and the plurality of subscriber-specific investigative query objects are digitally mapped to the alert name of the security alert by being programmatically accessible through the root-level object that includes the alert name of the security alert.

In one embodiment, the alert identifier of the security alert corresponds an alert name of the security alert, the service-specific investigative queries file is structured according to a hierarchical data schema, wherein the service-specific investigative queries file includes: a root-level object that includes the alert name of the security alert, and a nested object within the root-level object that includes the plurality of service-specific investigative query objects, and the plurality of service-specific investigative query objects are digitally mapped to the alert name of the security alert by being programmatically accessible through the root-level object that includes the alert name of the security alert.

In one embodiment, the subscriber-specific investigative queries file is structured according to a first hierarchical data schema, the service-specific investigative queries file is structured according to a second hierarchical data schema, and the first hierarchical data schema is different than the second hierarchical data schema.

In one embodiment, the first plurality of computer-executable investigation queries are operably configured to investigate a first distinct security investigation question, a first subset of the corpus of investigation findings data includes investigation findings data that answers the first distinct security investigation question, the computer-implemented method further includes: automatically generating a first data table that includes the investigation findings data of the first subset that answers the first distinct security investigation question, and automatically generating a first user interface (UI) tile that includes the first distinct security investigation question and the first data table, wherein the first data table is positioned below the first distinct security investigation question within the first UI tile, and displaying, via the graphical user interface, the security alert in association with the corpus of investigation findings data includes displaying the first UI tile on the graphical user interface.

In one embodiment, the second plurality of computer-executable investigation queries are operably configured to investigate a second distinct security investigation question, a second subset of the corpus of investigation findings data includes investigation findings data that answers the second distinct security investigation question, the computer-implemented method further includes: automatically generating a second data table that includes the investigation findings data of the second subset that answers the second distinct security investigation question, and automatically generating a second UI tile that includes the second distinct security investigation question and the second data table, wherein the second data table is positioned below the second distinct security investigation question within the second UI tile, and displaying, via the graphical user interface, the security alert in association with the corpus of investigation findings data further includes displaying the second UI tile on the graphical user interface.

In one embodiment, the computer-implemented method further includes detecting the security alert corresponds to the security threat, and in response to detecting the security alert corresponds to the security threat, executing, in real time, a threat mitigation action that mitigates the security threat for the subscriber.

In one embodiment, the digital asset includes an endpoint of the subscriber, the digital activity relates to a process running on the endpoint of the subscriber, the security alert does not include any metadata indicating whether the process running on the endpoint initiated any domain name system (DNS) queries, at least one of the first plurality of computer-executable investigation queries or the second plurality of computer-executable investigation queries is operably configured to answer a DNS-related security investigation question, a subset of the corpus of investigation findings data includes a set of DNS queries that were initiated by the process running on the endpoint of the subscriber, and the computer-implemented method further includes: automatically generating a user interface (UI) component that includes the DNS-related security investigation question and the set of DNS queries that were initiated by the process running the endpoint of the subscriber, wherein: the DNS-related security investigation question is positioned above the set of DNS queries within the UI component, and displaying the security alert in association with the corpus of investigation findings data on the graphical user interface includes displaying the UI component in association with the security alert on the graphical user interface.

In one embodiment, the computer-implemented method further includes detecting that the set of DNS queries initiated by the process includes at least one DNS query to a malicious domain; and in response to detecting the process initiated the at least one DNS query to the malicious domain, terminating, in real-time, the process running on the endpoint of the subscriber.

In one embodiment, the computer-implemented method further includes detecting the security alert corresponds to the benign security alert in response to assessing the security alert in association with the corpus of investigation findings data; receiving, via the graphical user interface, an input selecting a close alert button displayed on the graphical user interface; and in response receiving the input selecting the close alert button displayed on the graphical user interface, automatically closing, in real-time, the security alert, wherein automatically closing the security alert includes automatically attributing, in real-time, a benign alert tag to the security alert, and automatically routing the security alert from a pending security alert queue to a security alert disposal queue, wherein each security alert included in the pending security alert queue is awaiting an alert triage.

In one embodiment, the first plurality of computer-executable investigation queries and the second plurality of computer-executable investigation queries are simultaneously executed, executing one of the first plurality of computer-executable investigation queries includes: creating a first application programming interface (API) call operably configured to retrieve a first set of investigation findings data from the third-party service; creating a second API call operably configured to retrieve a second set of investigation findings data from a second third-party service different from the third-party service; transmitting, over a computer network, the first API call to an API endpoint provided by the third-party service; and transmitting, over the computer network, the second API call to an API endpoint provided by the second third-party service, executing one of the second plurality of computer-executable investigation queries includes: creating a third API call operably configured to retrieve a third set of investigation findings data from the third-party service; and transmitting, over the computer network, the third API call to the API endpoint provided by the third-party service, and the corpus of investigation findings data includes the first set of investigation findings data, the second set of investigation findings data, and the third set of investigation findings data.

In one embodiment, automatically constructing a respective computer-executable investigation query of the first plurality of computer-executable investigation queries includes: extracting, from the subscriber-specific investigative queries file, a plugin attribute specifying a target third-party service and a version of the target third-party service on which the respective computer-executable investigation query is to be executed; extracting, from the subscriber-specific investigative queries file, a capability attribute specifying a type of query operation to be executed by the target third-party service; extracting, from the subscriber-specific investigative queries file, a start time value specifying a first amount of time, extracting, from the subscriber-specific investigative queries file, an end time value specifying a second amount of time, obtaining a target subscriber-specific investigative query object of the plurality of subscriber-specific investigative query objects extracted from the subscriber-specific investigative queries file, wherein the target subscriber-specific investigative query object includes a query template that includes a plurality of evidence data fields and a plurality of fixed tokens; converting the query template to an alert-specific query by automatically populating each evidence data field of the plurality of evidence data fields with a respective piece of evidence data included in the first subset of evidence data; creating, based on application programming interface (API) protocols specified by the target third-party service, an API call that includes: a representation of the plugin attribute, a representation of the capability attribute, the alert-specific query, and a query time range determined based on the start time value and the end time value.

In one embodiment, executing the first plurality of computer-executable investigation queries includes transmitting, over a computer network, the API call to an API endpoint provided by the target third-party service, the target third-party service is different from the third-party service that detected the digital activity, and the computer-implemented method further includes: in response to transmitting the API call to the API endpoint provided by the target third-party service, obtaining a subset of the corpus of investigation findings data, wherein the subset of the corpus of investigation findings data includes: a first set of raw logs retrieved from the target third-party service that occurred before the security alert was generated, and a second set of raw logs retrieved from the target third-party service that occurred after the security alert was generated.

In one embodiment, automatically constructing a respective computer-executable investigation query of the second plurality of computer-executable investigation queries includes: extracting, from the service-specific investigative queries file, a plugin attribute specifying the third-party queries file, a plugin attribute specifying the third-party service and a version of the third-party service on which the respective computer-executable investigation query is to be executed; extracting, from the service-specific investigative queries file, a capability attribute specifying a type of query operation to be executed by the third-party service; extracting, from the service-specific investigative queries file, a start time value specifying a first amount of time, extracting, from the service-specific investigative queries file, an end time value specifying a second amount of time, obtaining a target service-specific investigative query object of the plurality of service-specific investigative query objects extracted from the service-specific investigative queries file, wherein the target service-specific investigative query object includes an query template that includes a plurality of evidence data fields and a plurality of fixed tokens; converting the query template to an alert-specific query by automatically populating each evidence data field of the plurality of evidence data fields with a respective piece of evidence data included in the second subset of evidence data; and creating, based on application programming interface (API) protocols specified by the third-party service, an API call that includes: a representation of the plugin attribute, a representation of the capability attribute, the alert-specific query, and a query time range determined based on the start time value and the end time value.

In one embodiment, executing the second plurality of computer-executable investigation queries includes transmitting, over a computer network, the API call to an API endpoint provided by the third-party service, and the computer-implemented method further includes: in response to transmitting the API call to the API endpoint provided by the third-party service, obtaining a subset of the corpus of investigation findings data, wherein the subset of the corpus of investigation findings data includes: a first set of raw logs retrieved from the third-party service that occurred before the security alert was generated, and a second set of raw logs retrieved from the third-party service that occurred after the security alert was generated.

In one embodiment, the subscriber-specific investigative queries file is a first Yet Another Markup Language (YAML) file, and the service-specific investigative queries file is a second YAML file.

In one embodiment, a method includes generating a security alert for a subscriber in response to assessing digital activity that occurred on a digital asset of the subscriber; executing an automated investigation protocol for the security alert in response to providing, as input, the security alert to the automated investigation protocol, wherein executing the automated investigation protocol includes: automatically extracting, from the security alert, an alert identifier of the security alert, a name of a third-party service that detected the digital activity, and a globally unique identifier (GUID) that corresponds to the subscriber; automatically detecting that (i) a first directory path comprising the GUID exists within a hierarchical file system and (ii) a second directory path comprising the name of the third-party service exists within the hierarchical file system; in response to detecting the first directory path and the second directory path exist within the hierarchical file system, automatically loading, into memory, a subscriber-specific investigative queries file located within the first directory path and a service-specific investigative queries file located within the second directory path; automatically extracting, from the subscriber-specific investigative queries file loaded into the memory, a plurality of subscriber-specific investigative query objects digitally mapped to the alert identifier corresponding to the security alert; in response to extracting the plurality of subscriber-specific investigative query objects, automatically constructing a first plurality of computer-executable investigation queries using the plurality of subscriber-specific investigative query objects and a first subset of evidence data included in the security alert; automatically extracting, from the service-specific investigative queries file loaded into the memory, a plurality of service-specific investigative query objects digitally mapped to an alert-agnostic text string; in response to extracting the plurality of service-specific investigative query objects, automatically constructing a second plurality of computer-executable investigation queries using the plurality of service-specific investigative query objects and a second subset of evidence data included in the security alert; and obtaining, in response to executing the first plurality of computer-executable investigation queries and the second plurality of computer-executable investigation queries, a corpus of investigation findings data indicative of whether the security alert corresponds to a security threat or a benign security alert; and displaying, via a graphical user interface, the security alert in association with the corpus of investigation findings data.

In one embodiment, the service-specific investigative queries file includes a root-level object that includes the alert-agnostic text string, and a nested object within the root-level object that includes the plurality of service-specific investigative query objects, the root-level object that includes the alert-agnostic text string includes all service-specific investigative query objects useable for any security alert having at least one piece of alert metadata referencing the third-party service, the plurality of service-specific investigative query objects are digitally mapped to the alert-agnostic text string by being programmatically accessible through the root-level object that includes the alert-agnostic text string, and the alert-agnostic text string has only three characters.

In one embodiment, the computer-implemented method or method includes before executing the first plurality of computer-executable investigation queries and the second plurality of computer-executable investigation queries: predicting, using a machine learning model, a respective query execution priority score for each computer-executable investigation query of the first plurality of computer-executable investigation queries and the second plurality of computer-executable investigation queries; assigning, to each computer-executable investigation query, the respective query execution priority score predicted by the machine learning model, wherein: a first set of computer-executable investigation queries of the first plurality of computer-executable investigation queries and the second plurality of computer-executable investigation queries fails to satisfy a predefined minimum score threshold, a second set of computer-executable investigation queries of the first plurality of computer-executable investigation queries and the second plurality of computer-executable investigation queries satisfies the predefined minimum score threshold, and executing the first plurality of computer-executable investigation queries and the second plurality of computer-executable investigation queries includes only executing computer computer-executable investigation queries that satisfy the predefined minimum score threshold.

In one embodiment, the computer-implemented method or method includes before executing the first plurality of computer-executable investigation queries and the second plurality of computer-executable investigation queries: predicting, using a machine learning model, a respective query execution priority score for each computer-executable investigation query of the first plurality of computer-executable investigation queries and the second plurality of computer-executable investigation queries; assigning, to each computer-executable investigation query, the respective query execution priority score predicted by the machine learning model, wherein: a first set of computer-executable investigation queries of the first plurality of computer-executable investigation queries and the second plurality of computer-executable investigation queries fails to satisfy a predefined minimum score threshold, a second set of computer-executable investigation queries of the first plurality of computer-executable investigation queries and the second plurality of computer-executable investigation queries satisfy the predefined minimum score threshold, and executing the first plurality of computer-executable investigation queries and the second plurality of computer-executable investigation queries includes executing the second set of computer-executable investigation queries before the first set of computer-executable investigation queries.

In one embodiment, the respective query execution priority score computed for a subject computer-executable investigation query indicated a predicted likelihood or a predicted probability that execution of the subject computer-executable investigation query will yield investigation findings data that is probative to determining whether the security alert corresponds to the security threat or the benign security alert.

In one embodiment, the computer-implemented method or method includes detecting the security alert corresponds to one of the security threat or the benign security alert based on an assessment of the graphical user interface.

BRIEF DESCRIPTION OF THE FIGURES

FIG. 2 illustrates an example method 200 in accordance with one or more embodiments of the present application;

FIG. 3 illustrates a schematic representation of a vendor-specific query template in accordance with one or more embodiments of the present application;

FIG. 4 illustrates a schematic representation of a customer-specific query template in accordance with one or more embodiments of the present application;

FIG. 5 illustrates a schematic representation of a vendor sub-template in accordance with one or more embodiments of the present application;

FIGS. 6A-6B illustrate schematic representations of query template artifacts in accordance with one or more embodiments of the present application;

FIG. 7 illustrates a schematic representation of a query template artifact directory structure in accordance with one or more embodiments of the present application;

FIG. 10A illustrates a schematic representation of rendered argument construct in accordance with one or more embodiments of the present application;

FIG. 10B illustrates a schematic representation of an investigative query task in accordance with one or more embodiments of the present application;

FIG. 13 illustrates an exemplary user interface for surfacing investigative query results in accordance with one or more embodiments of the present application;

FIGS. 14 and 14A illustrate an example computer-implemented method in accordance with one or more embodiments of the present application;

FIG. 15 illustrates an example of a hierarchical file system in accordance with one or more embodiments of the present application;

FIGS. 16 and 16A illustrate an example of a first hierarchical data schema and a second hierarchical data schema in accordance with one or more embodiments of the present application;

FIG. 16B illustrates an example of a computer-executable investigative query in accordance with one or more embodiments of the present application.

DESCRIPTION OF THE PREFERRED EMBODIMENTS

Figure 1:
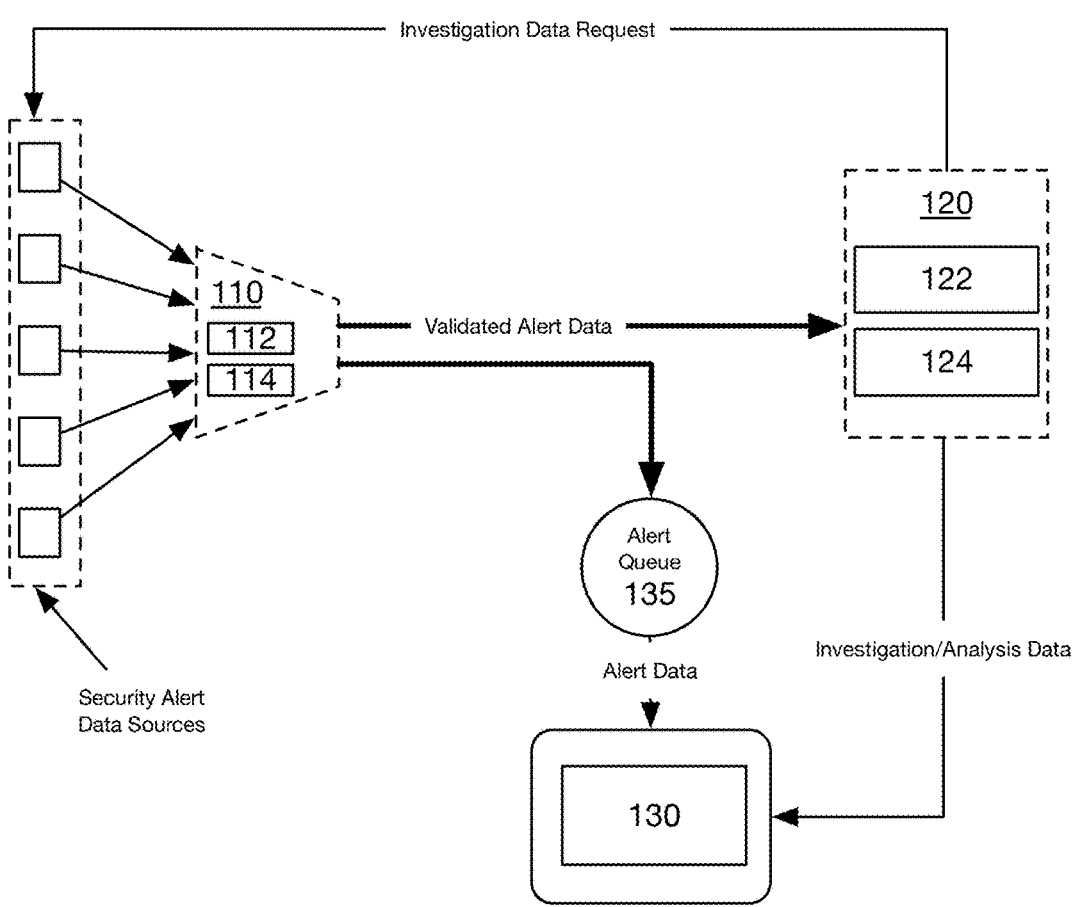
FIG. 1 illustrates a schematic representation of a system 100 in accordance with one or more embodiments of the present application.

The following description of the preferred embodiments of the inventions are not intended to limit the inventions to these preferred embodiments, but rather to enable any person skilled in the art to make and use these inventions.

The systems, methods, and computer-program products described herein may be used in any suitable security environment that requires real-time or near real-time assessment and handling of inbound security alerts to protect computing assets, digital infrastructure, and subscriber environments from harm. Such inbound security alerts may relate to suspicious electronic communications, file attachments, file hashes, command-line execution events, process execution events, or any other security event or alert that may exhibit suspicious characteristics.

Conventional cybersecurity systems do not provide real-time, automated, nor context-aware execution of targeted investigative queries that are dynamically customized to both a subscriber's unique computing environment and the characteristics of the service or security device that generated the security alert. Instead, such conventional cybersecurity systems assess each security event in isolation without leveraging hierarchically organized investigative query templates that are digitally mapped to alert-specific or alert-agnostic identifiers. The absence of structured, pre-mapped investigative query templates in such conventional cybersecurity systems slows down threat detection and security event triage, resulting in increased detection latency, delayed threat containment, and prolonged threat exposure within the computing environment.

Conversely, the systems, methods, and computer-program products described herein enable real-time or near real-time execution of investigative queries that are automatically selected and constructed from both subscriber-specific and service-specific repositories of pre-mapped investigative query templates. The subscriber-specific and service-specific repositories of pre-mapped investigative query templates are hierarchically organized within a file system according to subscriber identifiers and service or security device identifiers, enabling rapid identification of relevant investigative query templates for a given security alert. Once retrieved, the investigative query templates are programmatically populated with alert-specific evidence data to produce executable investigative queries tailored to the context of the security alert. Executing these investigative queries in real time or near real time produces investigation findings that can confirm or refute the presence of a security threat and provide a basis for automated or semi-automated threat mitigation actions when needed.

By combining hierarchical query template mapping with automated investigative query construction and execution, the embodiments described herein improve the speed, accuracy, and consistency of threat detection and security event triage. Additionally, such embodiments described herein may further reduce detection latency, accelerate threat containment, and minimize the operational window in which a security threat can propagate, exfiltrate data, or disrupt services of a subscriber.

Additionally, in some of the systems, methods, and computer-program products described herein, the systems, methods, and computer-program products may function to automatically perform security investigation tasks (e.g., execute computer-executable investigative queries, etc.) and surface associated investigation findings within a graphical user interface. The systems, methods, computer-program products, and graphical user interface described herein may operate together to concurrently display a current security alert associated with a potential security threat in association with a corpus of investigation findings generated for the current security alert based at least in part on a plurality of subscriber-specific and service-specific computer-executable investigative queries executed in real time or near real time for the current security alert. Unlike conventional cybersecurity systems—which are not capable of automatically performing such security investigation tasks—the systems, methods, computer-program products, and graphical user interface described herein may surface all investigation findings for the current security alert within a single graphical user interface, thereby significantly reducing the number of inputs required to detect, evaluate, and respond to the potential security threat.

It shall be recognized that, in such an embodiment, reducing the number of inputs required for the user to assess the current security alert and perform corresponding threat mitigation or disposal actions reduces power usage and improves battery life of battery-operated devices by enabling the user to use the electronic device (e.g., computing device, battery-operated device, etc.) displaying the graphical user interface more quickly and efficiently. Therefore, the systems, methods, and computer-program products described herein provide an improvement over conventional cybersecurity systems by reducing cognitive burden on a user, preventing an unnecessary use of resources (e.g., central processing unit (CPU) resources, memory resources, battery resources, etc.), and saving resources (e.g., central processing unit (CPU) resources, memory resources, battery resources, etc.) while accelerating the end-to-end handling of security events, including triage, threat assessment, and threat mitigation-which is particularly important in battery-operated devices.

1. System for Remote Cyber Security Operations & Automated Investigations

As shown in FIG. 1, a system 100 for automatically generating and executing investigative queries in a cybersecurity event detection and response platform includes a security alert engine 110, an automated security investigations engine 120, and a security threat mitigation user interface 130. The system 100 may sometimes be referred to herein as a cybersecurity threat detection and threat mitigation system or a cybersecurity event detection and response service.

The system 100 may function to enable real-time cybersecurity threat detection, agile, and intelligent threat response for mitigating detected security threats in real-time or near real-time. It shall be recognized that "real-time" or "near real-time" as used herein may refer to performing an operation or generating an output within strict time constraints. For example, in one or more embodiments, real-time may be understood to be instantaneous, on the order of milliseconds, or on the order of minutes. Of course, depending on the particular temporal nature of the system in which an embodiment is implemented, other appropriate timescales may be considered acceptable for real-time or near real-time processing.

1.1 Security Alert Engine

The security alert aggregation and identification module 110, sometimes referred to herein as the "security alert engine 110" may be in operable communication with a plurality of distinct sources of cyber security alert data. In one or more embodiments, the module 110 may be implemented by an alert application programming interface (API) that may be programmatically integrated with one or more APIs of the plurality of distinct sources of cyber security alert data and/or native APIs of a subscriber to a security service implementing the system 100.

In one or more embodiments, the security alert engine 110 may include a security threat detection logic module 112 that may function to assess inbound security alert data using predetermined security detection logic that may validate or substantiate a subset of the inbound alerts as security threats requiring an escalation, an investigation, and/or a threat mitigation response by the system 100 and/or by a subscriber to the system 100.

Additionally, or alternatively, the security alert engine 100 may function as a normalization layer for inbound security alerts from the plurality of distinct sources of security alert data by normalizing all alerts into a predetermined alert format.

1.1.1 Security Alert Machine Learning Classifier

Optionally, or additionally, the security alert engine 110 may include a security alert machine learning system 114 that may function to classify inbound security alerts as validated or not validated security alerts, as described in more detail herein.

The security alert machine learning system 114 may implement a single machine learning algorithm or an ensemble of machine learning algorithms. Additionally, the security alert machine learning system 114 may be implemented by the one or more computing servers, computer processors, and the like of the artificial intelligence virtual assistance platform 110.

The machine learning models and/or the ensemble of machine learning models of the security alert machine learning system 114 may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be used in implementing the security alert machine learning system 114 and/or other components of the system 100.

1.2 Automated Investigations Engine

The automated security investigations engine 120, which may be sometimes referred to herein as the "investigations engine 120", preferably functions to automatically perform (e.g., in real-time or near real-time) investigative tasks for addressing a security task and/or additionally, resolve a security alert. In one or more embodiments, the investigations engine 120 may function to automatically resolve (e.g., in real-time or near real-time) a security alert based on results of the investigative tasks.

In one or more embodiments, the investigations engine 120 may include an automated investigation workflows module 122 comprising a plurality of distinct automated investigation workflows that may be specifically configured for handling distinct security alert types or distinct security events. Each of the automated investigation workflows preferably includes a sequence of distinct investigative and/or security data production tasks that may support decisioning on or a disposal of a validated security alert. In one or more embodiments, the investigations engine 120 may function to select or activate a given automated investigation workflow from among the plurality of distinct automated investigation workflows based on an input of one or more of validated security alert data, a security alert classification label, and/or a security alert identifier (e.g., name of security alert).

Additionally, or alternatively, the investigations engine 120 may include an investigations instructions repository 124 that includes a plurality of distinct investigation instructions/scripts or investigation rules that inform or define specific investigation actions and security data production actions for resolving and/or addressing a given validated security alert. In one or more embodiments, the investigations instructions repository 124 may be dynamically updated to include additional or to remove one or more of the plurality of distinct investigation instructions/scripts or investigation rules.

1.3 Security Threat Mitigation User Interface

The security mitigation user interface 130 (e.g., Workbench) may function to enable an analyst or an administrator to perform, in a parallel manner, monitoring, investigations, and reporting of security incidents and resolutions to subscribers to the system 100 and/or service implementing the system 100. In some embodiments, an operation of the security user interface 130 may be transparently accessible to subscribers, such that one or more actions in monitoring, investigation, and reporting security threats or security incidents may be surfaced in real-time to a user interface accessible to a subscribing entity.

Accordingly, in or more embodiments, a system user (e.g., an analyst) or an administrator implementing the security mitigation user interface 130 may function to make requests for investigation data, make requests for automated investigations to the automated investigations engine 120, obtain security incident status data, observe or update configuration data for automated investigations, generate investigation reports, and/or interface with any component of the system 100 as well as interface with one or more systems of a subscriber.

Additionally, or alternatively, in one or more embodiments, the security mitigation user interface 130 may include and/or may be in digital communication with a security alert queue 135 that stores and prioritizes validated security alerts.

Additionally, or alternatively, in one or more embodiments, in response to the cybersecurity event detection and response service generating, in real-time or near real-time, a security alert for a subscriber to the cybersecurity event detection and response service, the cybersecurity event detection and response service may function to execute a plurality of computer-executable investigation queries to obtain investigation findings data indicative of whether the security alert corresponds to a security threat or a benign security alert. Accordingly, in one or more embodiments, the security mitigation user interface 130 (or any other graphical user interface provided by the cybersecurity event detection and response service) may function to display, in real-time or near real-time, the security alert in association with the corpus of investigation findings data.

The security mitigation user interface 130 (or any other graphical user interface provided by the cybersecurity event detection and response service) may function to display the security alert in association with the corpus of investigation findings data using one or more automatically generated user interface (UI) components, such as UI tiles. A UI tile, as generally referred to herein, may refer to a graphical user interface component that is programmatically generated and may include structured or unstructured content. A perimeter of the UI tile, in some embodiments, may have a visual border that visually distinguishes the UI tile from other UI elements displayed on the respective graphical user interface.

It shall be recognized that, in one or more embodiments, a respective UI tile included in the security mitigation user interface 130 (or any other graphical user interface provided by the cybersecurity event detection and response service) may include a distinct security investigation question in a header bar of the respective UI tile and include an investigation findings artifact (e.g., data table, interactive chart, log summary, key-value display, etc.) positioned below the distinct security investigation question that answers the distinct security investigation question.

It shall be further recognized that, in some embodiments, the security mitigation user interface 130 (or any other graphical user interface provided by the cybersecurity event detection and response service) may enable a user to detect whether the security alert corresponds to a security threat or a benign security alert based on an assessment of the security mitigation user interface 130.

It shall be further recognized that, in some embodiments, the UI tiles displayed on the security mitigation user interface 130 (or any other graphical user interface provided by the cybersecurity event detection and response service) may be scrollable, collapsible, or in a grid-based layout, and may include interactive UI elements, that when operated by a user, enables the user to expand investigation findings, initiate additional computer-executable investigation queries, annotate investigation findings, or perform, in real-time or near real-time, one or more threat mitigation actions directly from a corresponding UI tile. In other words, the use of such UI tiles may provide a modular and intuitive mechanism for visualizing complex investigation findings and accelerate a user's ability to assess, triage, and respond to security alerts.

2. Method for Automatically Generating and Executing One or More Investigative Queries in a Cybersecurity Event Detection and Response Service As shown in FIG. 2, a method 200 for automatically generating and executing one or more investigative queries in a cybersecurity event detection and response platform may include detecting one or more cybersecurity alerts S210, identifying one or more candidate query templates based on the one or more cybersecurity alerts S220, constructing one or more investigative query tasks based on the one or more candidate query templates S230, executing one or more investigative queries based on the one or more investigative query tasks S240, and surfacing alert context data based on the one or more investigative queries S250.

2.10 Detecting One or More Cybersecurity Alerts

S210, which includes detecting one or more cybersecurity alerts, may function to identify, detect, and/or receive alert data associated with one or more cybersecurity alerts from one or more internal or external data sources. In one or more preferred embodiments, the system 100 and/or the method 200 may detect or receive alert data from a cybersecurity event detection and response service (e.g., a system or service implementing method 200), which may identify and/or detect cybersecurity threats in real time or near real time.

In one or more embodiments, a system or service implementing method 200 (e.g., the cybersecurity event detection and response service) may be configured to have data integrations with one or more security and/or business applications (e.g., external vendor applications, and/or other third-party systems). It shall be recognized that the system or service implementing method 200 may identify, investigate, and/or respond to security events/alerts as described in U.S. patent application Ser. No. 17/488,800, titled SYSTEMS AND METHODS FOR INTELLIGENT CYBER SECURITY THREAT DETECTION AND MITIGATION THROUGH AN EXTENSIBLE AUTOMATED INVESTIGATIONS AND THREAT MITIGATION PLATFORM, U.S. patent application Ser. No. 17/501,708, titled SYSTEMS AND METHODS FOR INTELLIGENT PHISHING THREAT DETECTION AND PHISHING THREAT REMEDIATION IN A CYBER SECURITY THREAT DETECTION AND MITIGATION PLATFORM, U.S. patent application Ser. No. 17/671,881, titled SYSTEMS AND METHODS FOR INTELLIGENT CYBER SECURITY THREAT DETECTION AND INTELLIGENT VERIFICATION-INFORMED HANDLING OF CYBER SECURITY EVENTS THROUGH AUTOMATED VERIFICATION WORKFLOWS, U.S. patent application Ser. No. 17/850, 328, titled SYSTEMS AND METHODS FOR INTELLIGENT CYBERSECURITY ALERT SIMILARITY DETECTION AND CYBERSECURITY ALERT HANDLING, U.S. patent application Ser. No. 18/123,137, titled SYSTEMS AND METHODS FOR ACCELERATED REMEDIATIONS OF CYBERSECURITY ALERTS AND CYBERSECURITY EVENTS IN A CYBERSECURITY EVENT DETECTION AND RESPONSE PLATFORM, and U.S. patent application Ser. No. 18/129,638, titled SYSTEMS AND METHODS FOR INTELLIGENT CONFIGURATION AND DEPLOYMENT OF ALERT SUPPRESSION PARAMETERS IN A CYBERSECURITY THREAT DETECTION AND MITIGATION PLATFORM, which are incorporated herein in their entireties by this reference.

In one or more embodiments, S210 may function to collect inbound cybersecurity alerts by receiving cybersecurity alert data from one or more distinct alert data sources. In various embodiments, the one or more distinct alert data sources may include, but are not limited to, third-party services, third-party security services, external threat detection vendors, internal monitoring tools, cloud-based security telemetry platforms, and/or any other suitable source of cybersecurity alert data. In one or more embodiments, the cybersecurity alert data may include various metadata and evidence fields associated with one or more cybersecurity alerts, such as IP addresses, usernames, process names, and timestamps. In some embodiments, detected or received cybersecurity alerts may include unprocessed raw signal data or system-validated alerts that may be enriched and/or normalized into a common data model within the cybersecurity event detection and response service.

Additionally, or alternatively, in some embodiments, S210 may function to automatically ingest alert data signals via API calls, data polling tasks, and/or data push mechanisms from detection platforms, and in turn S210 may function to normalize the incoming cybersecurity alert(s) using an alert processing pipeline. In some embodiments, a remote procedure call (RPC) may trigger an internal plugin or normalizer, which may parse and/or enriches the cybersecurity alert data, eventually resulting in a system-generated or system-validated cybersecurity alert.

In some embodiments, detected cybersecurity alerts may be stored in a structured format within the cybersecurity event detection and response service. In one or more embodiments, the detected cybersecurity alert(s) may additionally or alternatively be added to a security alert queue (e.g., pending security alert queue) for triage. In certain embodiments, the system 100 and/or the cybersecurity event detection and response service may automatically evaluate the alert and determine whether it is appropriate to initiate an investigative query workflow. The term "investigative query workflow," as generally used herein, may refer to a workflow that may function to retrieve and/or surface alert context data associated with one or more cybersecurity alerts.

Additionally, or alternatively, in one or more embodiments, S210 may function to automatically generate, in real-time or near real-time, a security alert for a subscriber in response to assessing digital activity that occurred on a digital asset or computing asset of the subscriber, as shown generally by way of example in FIG. 14 and FIG. 14A. The security alert may include one or more pieces of metadata and/or one or pieces of evidence. The one or more pieces of evidence included in the security alert may include one or more of a name of the digital asset or computing asset (e.g., server, virtual machine, container, etc.) of the subscriber, a command-line string executed by a process associated with the security alert, a cryptographic file hash (e.g., MD5, SHA-1, or SHA-256) of a file implicated in the security alert, a file name or file path, a process identifier (PID), process metadata (e.g., process name, parent process, execution path), a username or account identifier associated with the digital activity, and/or a threat model identifier that corresponds to a detection rule, behavioral signature, or classification model that triggered the security alert.

2.20 Identifying One or More Candidate Query Templates Based on the One or More Cybersecurity Alerts S220, which includes identifying one or more candidate query templates based on the one or more cybersecurity alerts, may function to identify one or more candidate query templates associated with the one or more received cybersecurity alerts for processing and query construction. The term "query template," as generally used herein, may refer to a data construct that may define a structured and/or parameterized query that may be used as a template to construct an investigative query (e.g., computer-executable investigation query or the like). The term "investigative query," as generally used herein, may refer to a query that may be executed to retrieve and/or return alert context data related to a distinct cybersecurity alert. The term "alert context data," as generally used herein, may refer to data (e.g., structured or unstructured data) that may provide additional insight and/or supporting evidence related to a distinct cybersecurity alert. In some embodiments, in response to detecting or generating one or more cybersecurity alerts (e.g., as described in S210), S220 may function to attempt to identify matching candidate query templates that may define the structure and parameters of investigative queries relevant to each of the one or more cybersecurity alerts.

In one or more embodiments, query templates may be stored in one or more query template artifacts. The term "query template artifact," or "template artifact," as used herein, may refer to a data structure (e.g., a data file) that may include one or more query templates. In some embodiments, one or more query template artifacts may be formatted in a data serialization format, such as Yet Another Markup Language (YAML) and/or the like. In one or more embodiments, each query template in a query template artifact may comprise a data structure or data object stored in the data serialization format of the query template artifact.

Query Template Structure

In some embodiments, identifying a candidate query template may include locating and/or retrieving an investigative query template that may define a structured and parameterized query to be used for gathering alert context data related to a cybersecurity alert. In some embodiments, a query template may include or refer to a data construct or data structure that may specify query logic and/or query construction logic, input arguments (including, but not limited to, time ranges and query strings), and/or placeholders for evidence fields in the query. In one or more embodiments, evidence field placeholders may function to receive evidence data extracted from a cybersecurity alert during investigative query construction. In some embodiments, investigative query templates may be categorized by customer (customer-specific templates) or by vendor (vendor-specific templates), which may enable tailored investigative actions depending on the source and environment of the alert.

In some embodiments, each query template may include one or more query template properties that may define the respective query template. In some embodiments, the one or more query template properties may include an alert name property, which may identify the specific alert type that the query template may apply to. In some embodiments, the alert name property may include, or be replaced by, a wildcard value such as "All" that may indicate the query template may apply to any alert type.

Additionally, in some embodiments, the one or more query template properties may include a vendor name property, which may associate the query template with a particular technology, platform, or vendor. Additionally, or alternatively, in some embodiments, the one or more query template properties may include a plugin property, which may specify the plugin or module version that may be used to interface with the vendor API and/or data system. Additionally, in some embodiments, the one or more query template properties may include a capability property that may define a type of operation or query to perform within the selected plugin (e.g., a raw log search or a database lookup).

Query Structure: Query Template Strings

In various embodiments, the one or more query template properties of a query template may include a set of one or more input arguments, which may include one or more query template strings. The term "query template string," as used herein, may refer to an unconstructed or partially constructed query statement or string that may include one or more placeholders for evidence fields that must be filled with alert-specific evidence data during investigative query construction. In some embodiments, each set of query template input arguments may include a set of n query template strings, where n may be greater than or equal to one.

In various embodiments, evidence field placeholders may include, but are not limited to, file hash placeholders, file name placeholders, internet protocol (IP) address placeholders, process name placeholders, username placeholders, threat model ID placeholders, process argument placeholders, process ID placeholders, asset placeholders, and/or any other suitable placeholder for evidence data that may be extracted from a cybersecurity alert. In some embodiments, evidence field placeholders may include evidence field markers, which may comprise one or more tokens (e.g., characters) that may function to signal where alert evidence data should be inserted during query construction. For example, an evidence field placeholder may include "{ips.IN}", with curly bracket tokens "{" and "}" as evidence field markers that may indicate where IP alert evidence data should be inserted in the query template string. It shall be noted that the above example is non-limiting, and evidence field placeholders may include any suitable token(s) as evidence field markers.

In some embodiments, evidence field placeholders may function as placeholders for a plurality of values (e.g., a plurality of distinct evidence data values or the like). For instance, an evidence field placeholder for usernames may function as a placeholder for multiple usernames. In such instances, evidence field placeholders may include a delimiter that may control how multiple evidence field values are inserted into the query template string during query construction. In some embodiments, query template strings may include one or more inclusive delimiters, which may indicate that the corresponding evidence field values may be formatted as a list for inclusion in an "in" clause (e.g., "in ("value1", "value2")"). In some implementations, an inclusive delimiter may be represented by the term ".IN" or the like. Additionally, in some embodiments, query template strings may include one or more alternative delimiters, which may indicate that the corresponding evidence field values may be formatted using logical OR (e.g., value1 OR value2). In some implementations, an alternative delimiter may be represented by the term ".OR" or the like. In some embodiments, delimiters may be configured and/or defined for each vendor or plugin associated with one or more detected cybersecurity alerts.

As a non-limiting example, a query template string may include the username evidence field placeholder "({usernames.IN})". In this example, the inclusive delimiter ".IN" may function to indicate that, during downstream automated query construction, the username evidence field placeholder should be replaced with ("username 1", "username 2", . . . , "username n"), for a set of n usernames, as may be suitable for inclusion in an "in" clause in the final investigative query (e.g., a query for "username x" in a list of n usernames). In an alternative example, a query template string may include the username evidence field placeholder "({usernames.OR})." In this example, the alternative delimiter ".OR" may function to indicate that, during downstream automated query construction, the username evidence field placeholder should be replaced with ("username 1" OR "username 2" OR . . . OR "username n"), for a set of n usernames, as may be suitable for joining usernames in a logical OR statement in the final investigative query. It shall be noted that these examples are non-limiting, and query template strings may include other delimiter types and/or other delimiter representations for inclusive and alternative delimiters.

As a non-limiting example of a full query template string, a query template string may include the text string "select field from events where username in ("{usernames.IN}") last 1 hour." In this example, the placeholder evidence field ("{usernames.IN}") may refer to a list of one or more usernames associated with the corresponding cybersecurity alert that should be formatted in an inclusive list.

Query Template Structure: Temporal Arguments

Additionally, in various embodiments, the set of input arguments for an investigative query template may optionally include one or more temporal arguments. In various embodiments, the temporal arguments of a query template may include a start time argument and/or an end time argument that may define the time window that an investigative query constructed from the query template may cover. In some embodiments, the start time argument and/or the end time argument may comprise values in time units that may represent a temporal offset relative to a time (e.g., clock time) the cybersecurity alert was generated. As a non-limiting example, a query template including a start time argument of "−15 m" may configure investigative queries constructed based on that query template to retrieve alert context data from 15 minutes before the associated cybersecurity alert occurred or was generated. Additionally, in this example, the query template may include an end time argument of "1 d" which may configure investigative queries constructed based on that query template to retrieve alert context data over a time period that may extend to one day after the associated cybersecurity alert occurred or was generated. In one or more embodiments, time units may include seconds ("s"), minutes ("m"), hours ("h"), and/or days ("d"). In an alternative implementation, the start time argument and/or the end time argument may comprise values in time units that may represent an absolute or specific timestamp, where the time window of an investigative query template may be defined from the start timestamp to the end timestamp.

Query Structure: Template Keywords

In addition, in one or more embodiments, one or more investigative query templates may include a set of template keywords (sometimes referred to herein as "keywords") as template properties that may indicate the type of data to extract from a target cybersecurity alert. In some embodiments, the set of template keywords may include N keywords, where N may be greater than or equal to zero. In some such embodiments, one or more keywords may each be associated with a corresponding evidence extraction function based on a type of evidence field placeholder and/or evidence data to be extracted from a target cybersecurity alert and subsequently inserted into the query template string of the investigative query template during query construction. As a non-limiting example, template keywords used in a query template may include any of the following: "file_hashes," "file_names," "ips," "processes," and "usernames." In such an example, the keyword "ips" may correspond to an IP address extraction function that may in turn extract one or more IP addresses from the target cybersecurity alert data or metadata. In this example, other keywords may function in an analogous manner. It shall be noted that this exemplary list of keywords is non-limiting and extensible, and template keywords may include one or more keywords associated with any other suitable type of data to extract from a cybersecurity alert for inclusion in an investigative query.

Vendor-Specific Query Templates and Customer-Specific Query Templates

In various embodiments, one or more query templates may be configured to support investigative queries for different levels of specificity. For example, in some embodiments, a customer-specific query template may represent one or more investigative queries that may run across multiple technologies based on a distinct customer digital environment, while a vendor-specific query template may represent a distinct investigative query tailored to a single technology platform. The term "customer" in this context may refer to an entity (e.g., an organization, a subscriber, or the like) whose digital environment may be monitored by a system implementing method 200 (e.g., the cybersecurity event detection and response service) and for whom investigative queries may be defined. The term "vendor" in this context may refer to a technology (e.g., a third-party security technology service or provider) for which investigative queries may be configured.

In various embodiments, as shown by way of example in FIG. 3, a vendor-specific query template may refer to a standardized query template tailored to, or otherwise associated with, a particular technology or vendor platform, and may be designed to generate one or more investigative queries that may function to surface commonly needed alert context data from that specific technology or platform (e.g., context data from the logs or telemetry of a distinct technology platform). In some such embodiments, vendor-specific query templates may include and/or enable one or more investigative queries that may be applied across one or more (or all) customers using the corresponding technology or vendor platform. That is, in some embodiments, vendor-specific query templates may be customer-agnostic, and may apply to any customer that may receive a cybersecurity alert associated with the corresponding vendor technology or platform.

In various embodiments, as shown by way of example in FIG. 4, a customer-specific query template may refer to a query template that may be designed to support alert investigative workflows that may be unique to a particular customer (e.g., a subscriber or user) environment, and may reflect the customer infrastructure, preferences, and/or other alert investigation requirements. In some embodiments, customer-specific query templates may include, or enable, investigative queries that may span one or more vendors (e.g., one or more technologies and/or data sources). In such embodiments, a customer-specific query template may include one or more vendor sub-templates that may each be associated with a distinct vendor, as shown by way of example in FIGS. 4-5. In some such embodiments, a customer-specific query template may include an alert name and a set of n vendor sub-templates, where n may be greater than or equal to one. In such an implementation, each vendor sub-template may include template properties, such as a vendor name property, a plugin property, a capability property, one or more input arguments including one or more query template strings, template keywords, and/or other suitable template properties, that may function as previously described. It shall be noted that, when describing investigative query construction herein, the term "query template" may refer to vendor-specific query templates, customer-specific query templates, and/or vendor sub-templates.

In some embodiments, each query template may be stored in a query template artifact, such that each query template artifact may include one or more query templates. In one or more embodiments, query template artifacts may include vendor-specific query template artifacts and customer-specific query template artifacts.

In such embodiments, each vendor-specific query template artifact (e.g., service-specific investigative queries file or the like) may include one or more vendor-specific query templates, as shown by way of example in FIG. 6A. In such embodiments, each vendor-specific query template artifact may be associated with a distinct vendor and may include vendor-specific query templates associated with that distinct vendor.

Additionally, in some embodiments, each customer-specific query template artifact (e.g., subscriber-specific investigative queries file or the like) may include one or more customer-specific query templates, as shown by way of example in FIG. 6B. In such embodiments, each customer-specific query template artifact may be associated with a distinct customer and may include customer-specific query templates associated with that distinct customer.

Query Template Artifact Directory

In one or more embodiments, investigative query templates may be stored in one or more query template artifacts. As a non-limiting example, investigative query templates may be stored in configuration files written in YAML (.yml) format. In some embodiments, as shown by way of example in FIG. 7, the query template artifacts may be organized into a query template artifact directory structure (e.g., hierarchical file system) that may separate customer-specific templates from vendor-specific templates. As a non-limiting example, the directory structure may include a customer directory sub-structure (e.g., subscriber directory sub-structure or the like) that may include a customer directory for each distinct customer comprising one or more customer-specific templates; for instance, each customer directory name may include a unique customer ID corresponding to a distinct customer. Additionally, in this non-limiting example, the directory structure may include a vendor directory sub-structure (e.g., service directory sub-structure or the like) that may include a vendor directory for each distinct vendor comprising one or more vendor-specific templates; for instance, each vendor directory name may include a vendor name or vendor ID corresponding to a distinct vendor.

Candidate Query Template Identification: Alert-Template Matching

Figure 8:
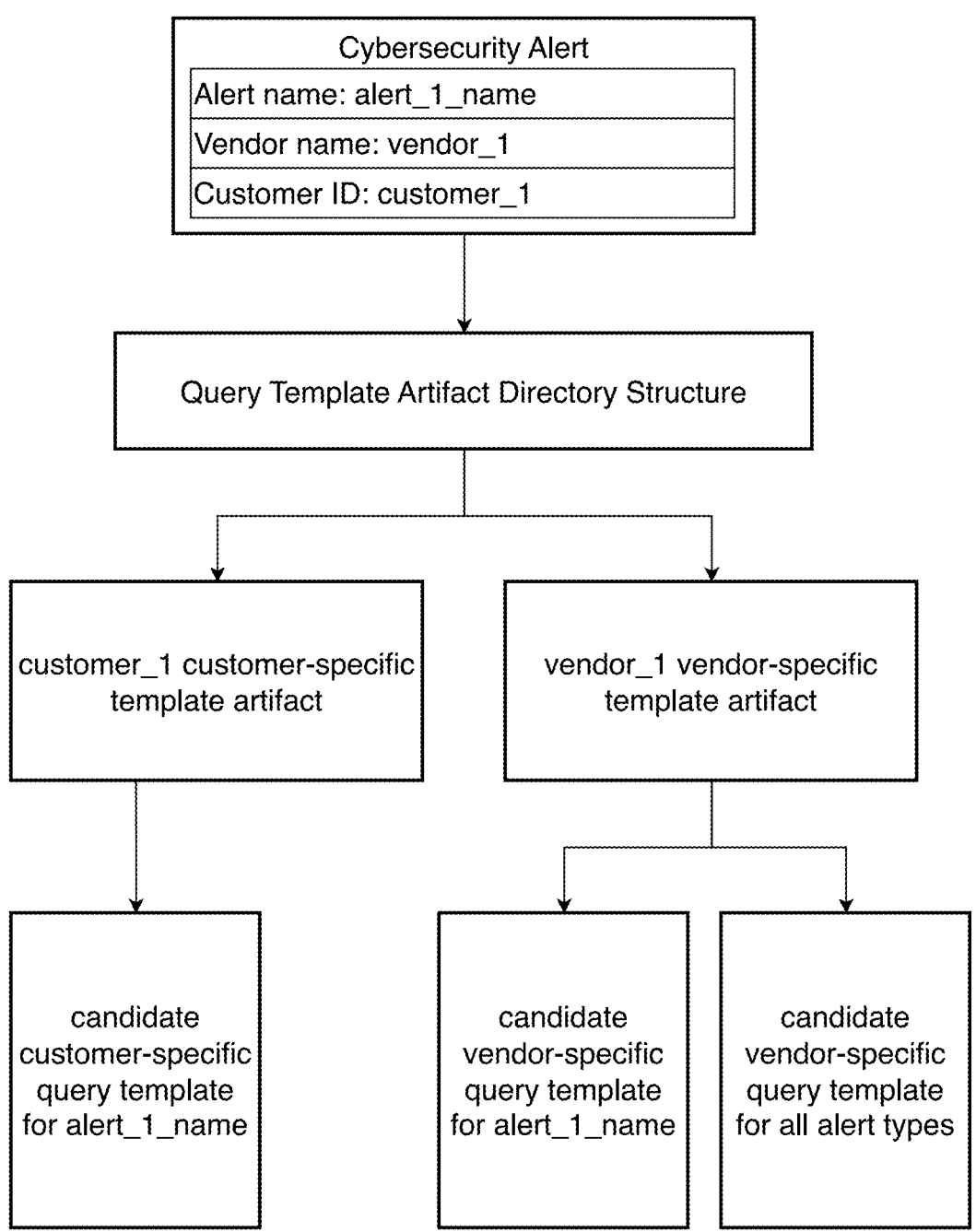
FIG. 8 illustrates a schematic representation of candidate query template selection in accordance with one or more embodiments of the present application.

In some embodiments, S220 may function to attempt to identify and/or select one or more candidate query templates based on receiving a target cybersecurity alert, as shown by way of example in FIG. 8. The term "target cybersecurity alert" in this context may refer to a distinct cybersecurity alert of the detected cybersecurity alerts. It shall be noted that the steps of method 200 may function to process each of the detected cybersecurity alerts, either serially, simultaneously, in parallel, or in a combination of serial and parallel processing, in the same manner as described for the target cybersecurity alert.

In some embodiments, S220 may function to identify the customer and/or the vendor associated with the target cybersecurity alert. For example, S220 may function to extract a customer identifier (e.g., a unique customer ID or customer name) and/or a vendor identifier (e.g., a unique vendor ID or vendor name) from the target cybersecurity alert. Subsequently, S220 may function to search for and retrieve any query template artifacts stored in the corresponding customer and vendor directories (e.g., the directories matching the vendor and customer identifiers) as candidate query template artifacts that match the vendor or customer associated with the target cybersecurity alert.

In some embodiments, if any candidate query template artifacts are retrieved for the target cybersecurity alert, S220 may then function to determine if any query templates in the candidate query template artifacts correspond to the target cybersecurity alert. For instance, S220 may function to search each candidate query artifact for query templates that include an alert name property matching the name or type of the target cybersecurity alert. In addition to specific alert name matches, S220 may additionally or alternatively support a wildcard match, for example based on the wildcard term "All," which may indicate that a query template should apply to all cybersecurity alert types. Preferably, S220 may function to identify any query templates that match the alert name or type of the target cybersecurity alert, and/or any query templates that may include a wildcard match term (e.g., "All"), as candidate query templates.

As a non-limiting example, a target cybersecurity alert for customer "X" in vendor technology "Y" may be detected, with an alert name "Z" (e.g., by S210). In this example, S220 may function to search the query template artifact directory for any query template artifact(s) in a directory corresponding to customer "X" and a directory corresponding to vendor "Y." In such an example, S220 may retrieve a candidate customer-specific query template artifact from the customer "X" directory, and a candidate vendor-specific query template artifact from the vendor "Y" directory. In turn, S220 may function to search the retrieved candidate customer- and vendor-specific query template artifact(s) for any customer- and vendor-specific query templates that may include the alert name "Z" as an alert name property, and/or the wildcard term "All." In this example, S220 may then function to identify any such matching customer- and vendor-specific query templates as candidate query templates. It shall be noted that the above example is non-limiting, and in addition the characters "X," "Y," and "Z" in the example may be replaced with any suitable customer identifier, vendor identifier, and/or alert name, respectively.

Stated another way, in one or more embodiments, the system or service implementing method 200 may function to generate a security alert for a subscriber in response to assessing digital activity that occurred on a digital asset of the subscriber. In such an embodiment, the system or service implementing method 200 may function to execute, in real-time or near real-time, an automated investigation protocol (e.g., automated investigation workflow or the like) in response to providing, as input, the security alert to the automated investigation protocol. An automated investigation protocol, as generally referred to herein, may include a predefined or dynamically generated sequence of computer-executable operations that extract evidence data from a respective security alert, retrieve one or more investigative query objects from subscriber-specific and/or service-specific data stores, construct and execute a plurality of investigation queries based on the retrieved investigative query objects and the extracted evidence data, and retrieve investigation findings data that is indicative of whether the security alert corresponds to a security threat or a benign security alert. In some embodiments, the system or service implementing method 200 may be configured to automatically and/or simultaneously investigate hundreds of thousands, millions, or even billions of security alerts across thousands of subscribers to the system or service implementing method 200, with each security alert processed through a corresponding instance of the automated investigation protocol. Such a process may substantially reduce alert fatigue, enhance analyst productivity, and improve the precision of downstream threat mitigation and alert disposition actions.

Query Construction Modules

Figure 9:
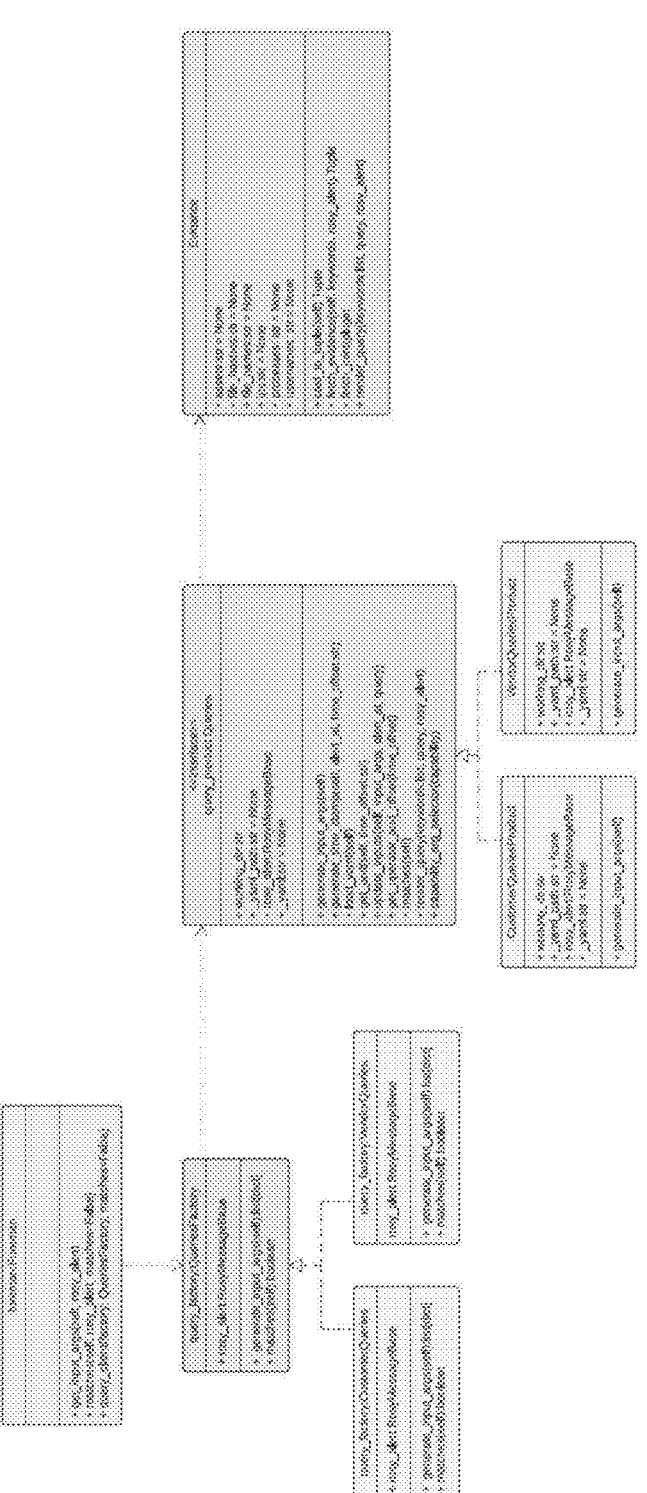
FIG. 9 illustrates a schematic representation of query construction modules in accordance with one or more embodiments of the present application.

In some embodiments, S220 may function to implement one or more query construction modules to construct the one or more investigative queries, as shown by way of example in FIG. 9. In some such embodiments, S220 may function to implement the one or more query construction modules based on a factory design pattern to identify the one or more candidate query templates. In one such implementation, the one or more query construction modules may include a foreman module, one or more query factory modules, and one or more query product modules, which may all operate in a layered architecture to ensure that investigative queries may be dynamically constructed while ensuring an extensible investigative query construction workflow (e.g., automated investigation protocol or the like).

As a non-limiting example, in response to detecting one or more cybersecurity alerts, S220 may function to automatically implement one or more foreman modules that may each receive, as input, a target cybersecurity alert of the one or more detected cybersecurity alerts. In turn, S220 may function to automatically direct each foreman module to identify candidate query templates that may match the target cybersecurity alert. In response, the foreman module may function to implement and/or instantiate one or more query factory modules that may each function to process a specific type of query template. For example, the foreman module may function to implement a customer-specific query factory module for customer-specific query templates and a vendor specific query factory module for vendor-specific query templates. Subsequently, the foreman module may function to direct the implemented query factory modules to identify one or more candidate query templates that may correspond to the target cybersecurity alert.

In reference to the above non-limiting example, each query factory may function to automatically instantiate or implement a corresponding type of query product module to identify one or more candidate query templates. For instance, the customer-specific query factory module may function to implement a customer-specific query product module, and the vendor-specific query factory module may function to implement a vendor-specific query product module. In this example, the customer-specific query product module may function to identify alert-matching candidate customer-specific query templates from any customer-specific query template artifacts in the customer directory associated with the customer of the target cybersecurity alert. Additionally, in this example, the vendor-specific query product module may function to identify alert-matching candidate vendor-specific query templates from any vendor-specific template artifacts in the vendor directory associated with the vendor of the target cybersecurity alert. In this exemplary implementation, the query product modules may function to identify candidate query templates based on the alert-matching and/or wildcard-matching process as previously described.

Accordingly, S220 may enable a system implementing method 200 to automatically detect and/or automatically select the appropriate set of investigative query templates that may be contextually relevant to the generated or received security alert. In this way, S220 may function to enable automatic alert intelligence gathering by ensuring that relevant query templates may be selected for construction and execution in downstream processing.

2.30 Constructing One or More Investigative Query Tasks Based on the One or More Candidate Query Templates S230, which includes constructing one or more investigative query tasks based on the candidate query templates, may function to construct one or more investigative query tasks based on, or corresponding to, the one or more identified candidate query templates. The term "investigative query task," as used herein, may refer to a fully assembled, execution-ready structure that may be used to configure and/or execute a distinct investigative query (e.g., computer-executable investigation query). In some embodiments, constructing one or more investigative query tasks may include extracting one or more pieces of alert-specific evidence data to insert into the one or more candidate query templates. In one or more embodiments, one or more candidate query templates may include one or more placeholder evidence fields that must be populated with alert-specific evidence data extracted from a corresponding cybersecurity alert.

In some embodiments, in response to identifying applicable candidate query templates (e.g., via S220), S230 may function to initiate a query construction process that may dynamically build one or more complete investigative query tasks that may be tailored to the context of a target cybersecurity alert. In one or more embodiments, constructing the one or more complete investigative query tasks may include inserting values such as usernames, IP addresses, file hashes, process names, or other alert-specific evidence data into a corresponding candidate query template structure.

Rendered Argument Construct Generation

In one or more embodiments, S230 may function to construct one or more investigative query tasks for each query string template in an identified candidate query template. For instance, a candidate query template may include a set of n query template strings, where n may be greater than or equal to one. In such an example, S230 may function to construct a corresponding set of n investigative query tasks, where each constructed investigative query task may correspond to one of the n query template strings.

Figure 11:
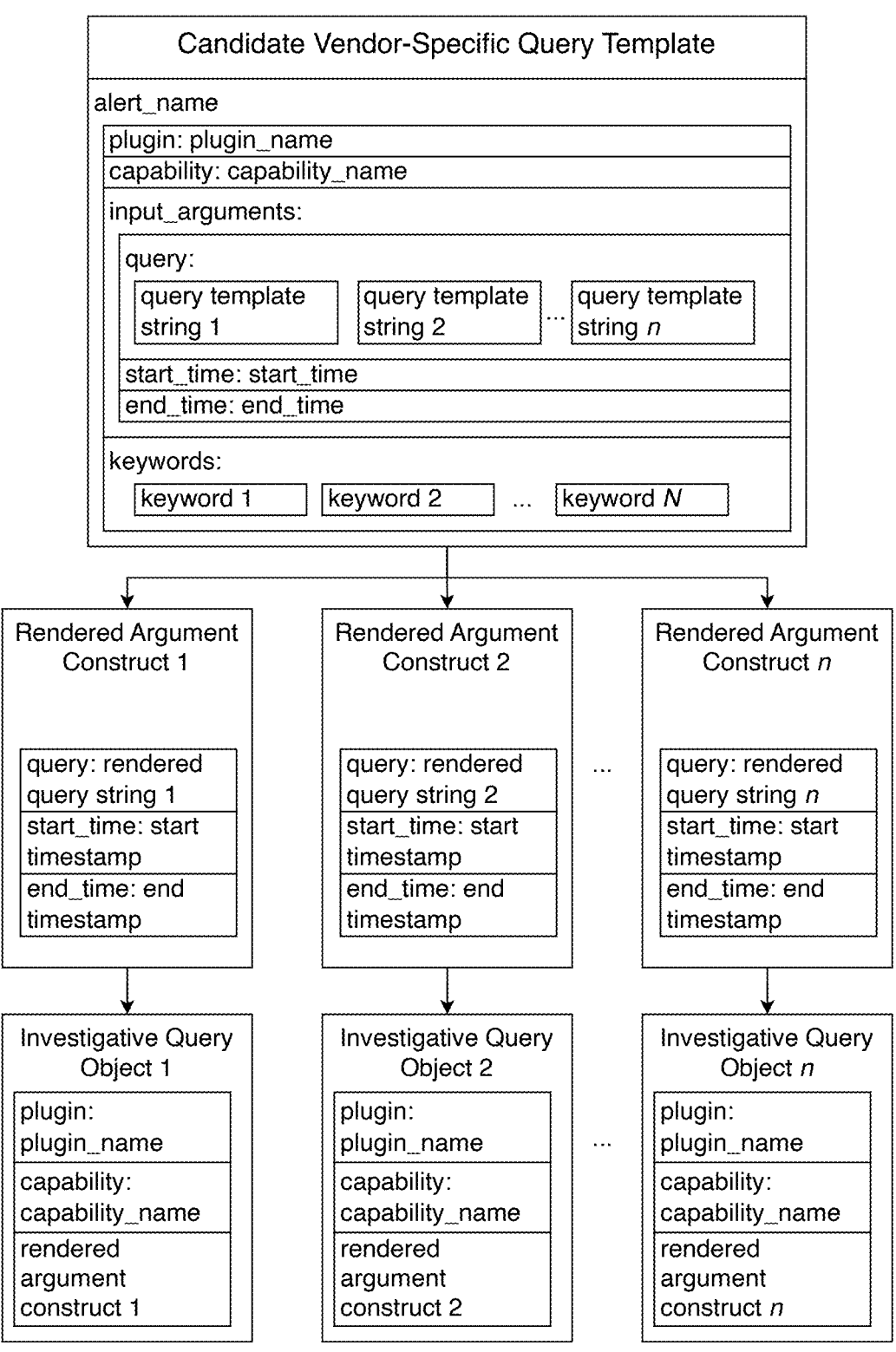
FIGS. 11-12 illustrate schematic representations of investigative query task construction in accordance with one or more embodiments of the present application.
Figure 12:
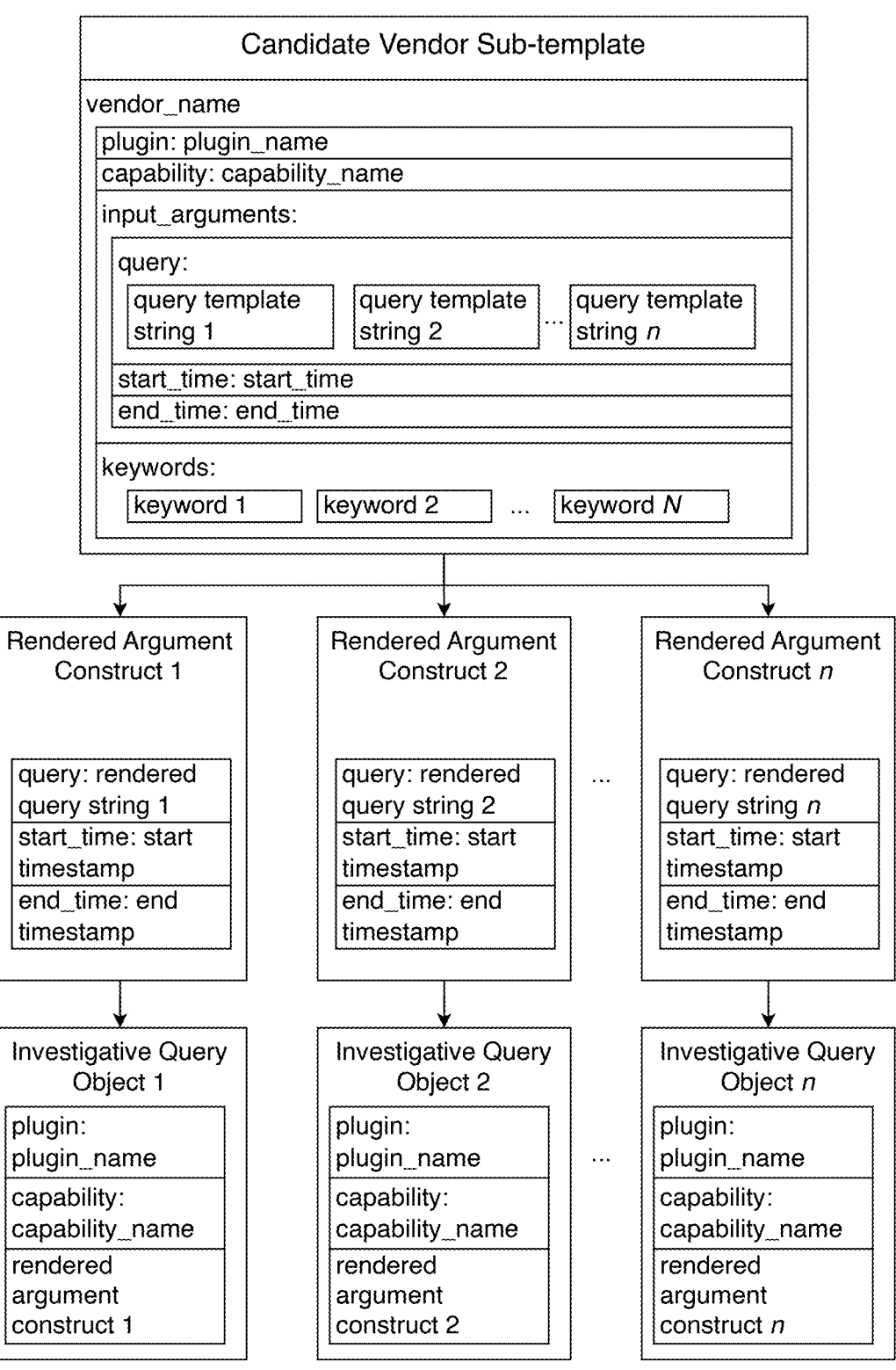

In some embodiments, each investigative query task may include a rendered argument construct. The term "rendered argument construct," as used herein, may refer to a data construct comprising a set of query input arguments that may define an investigative query, as shown by way of example in FIG. 10A. In various embodiments, the query input arguments of a rendered argument construct may include, but are not limited to, a rendered query string, a start timestamp, and an end timestamp. In one or more embodiments, S230 may function to generate a rendered argument construct for each query string template in a candidate vendor-specific query template, as shown by way of example in FIG. 11. Additionally, in one or more embodiments, S230 may function to generate a rendered argument construct for each query string template in each vendor sub-template in a candidate customer-specific query template, as shown by way of example in FIG. 12.

Rendered Argument Construct: Rendered Query String

In some embodiments, S230 may function to generate a rendered argument construct for each query template string in a candidate vendor-specific query template, and/or for each query template string in each candidate vendor sub-template of a candidate customer-specific query template. In such embodiments, for each query template string in a candidate query template (or vendor sub-template), S230 may function to parse placeholder evidence fields in the query template string. In turn, based on the keyword properties of the query template, S230 may then function to extract the appropriate alert evidence data values from the target cybersecurity alert. In this context, the "target cybersecurity alert" may refer to a distinct cybersecurity alert that may have been used to identify candidate query templates (as previously discussed). Preferably, S230 may then function to generate a rendered query string based on the inserting the alert evidence data into the corresponding placeholder evidence fields of the query template string.

Additionally, in some embodiments, S230 may function to identify any delimiters in the query template string, such as alternative and inclusive delimiters as previously discussed. In such embodiments, S230 may function to employ a corresponding evidence insertion pattern or logic based on the identified delimiter. For instance, if S230 identifies an alternative delimiter associated with a placeholder evidence field in a query template string (e.g., ".OR"), S230 may function to insert multiple alert evidence data values extracted from the target cybersecurity alert joined by "OR." In another example, if S230 identifies an inclusive delimiter associated with a placeholder evidence field in a query template string (e.g., ".IN"), S230 may function to insert multiple alert evidence data values extracted from the target cybersecurity alert joined together in an inclusive list.

As a non-limiting example, a target cybersecurity alert may be associated with three example IP addresses, 10.1.1.1, 10.2.2.2, and 10.3.3.3, and two usernames, "username1" and "username2." In this example, a query template string evaluated by S230 may include the placeholder evidence field {ips.OR} and {usernames.IN}. In such an example, S230 may function to extract the three IP addresses associated with the target cybersecurity alert and replace the placeholder evidence field {ips.OR} with "10.1.1.1 OR 10.2.2.2 OR 10.3.3.3". Additionally, in such an example, S230 may function to extract the two usernames associated with the target cybersecurity alert and replace the placeholder evidence field {usernames.IN} with ("username1", "username2").

As a non-limiting example of a full query template string that may be processed by S230, a query template string may include the text string "select field from events where username in ("{usernames.IN}") last 1 hour." In this example, the placeholder evidence field ("{usernames.IN}") may refer to a list of one or more usernames associated with the target cybersecurity alert that should be formatted in an inclusive list. Based on the query template string in this example, S230 may function to generate the rendered query string: "select field from events where username in ("username 1", username 2", . . . , "username n") last 1 hour."

Rendered Argument Construct: Timestamps

In one or more embodiments, S230 may additionally function to compute a start timestamp and/or an end timestamp for inclusion in a rendered argument construct. In such embodiments, S230 may function to compute the start timestamp and/or the end timestamp based on applying the relative time offsets that may be defined in the corresponding candidate query template to the timestamp of the cybersecurity alert. In some embodiments, one or more candidate query templates may include relative time offsets comprising a start time argument and/or an end time argument, as previously described. In some embodiments, S230 may function to compute the start timestamp based on parsing the start time argument and applying the offset defined therein to the cybersecurity alert timestamp. In an analogous way, S230 may function to compute the end timestamp based on the end time argument. It shall be noted that start and end time arguments are optional arguments, and any of the one or more query templates or vendor sub-templates may lack start and/or end time arguments. In such instances, S230 may function to skip the computation of the corresponding timestamp(s).

Investigative Query Task Construction

In some embodiments, S230 may function to construct an investigative query task (e.g., computer-executable investigation query or the like) based on each rendered argument construct. In one or more embodiments, an investigative query task may include a template plugin property, a template capability property, and a rendered argument construct, as shown by way of example in FIG. 10B. In some embodiments, S230 may function to construct an investigative query task for each rendered argument construct.

In some embodiments, each rendered argument construct generated by S230 may be associated with a distinct query template string from a distinct candidate query template. In one or more embodiments, S230 may function to construct an investigative query task based on each rendered argument construct that may include the rendered argument construct itself, the plugin template property of the associated distinct candidate query template, and the capability template property of the associated distinct candidate query template. Accordingly, each investigative query task constructed by S230 may comprise necessary and/or sufficient data for investigative query execution.

In some embodiments, the constructed investigative query tasks may be configured to be ready-to-run investigative query objects, instructions, tasks, or the like that may reflect both the detection context (i.e., cybersecurity alert(s) received) and investigative intent (i.e., what context an analyst or user may need to assess the target cybersecurity alert(s)). Accordingly, S230 may function to transform static query templates into actionable, dynamic investigative query tasks (e.g., computer-executable investigation queries) tailored to each specific cybersecurity alert instance, which may ensure relevance and precision in subsequent alert investigation steps.

In one or more embodiments, S230 may function to aggregate the one or more constructed investigative query tasks into a list or array of investigative query tasks associated with the target cybersecurity alert. In some such embodiments, for a distinct target cybersecurity alert, S230 may function to append each constructed investigative query task to the list in real-time, as each investigative query task is constructed. Alternatively, in some implementations, S230 may function to aggregate or collate each constructed investigative query task for a target cybersecurity alert once all investigative query tasks for that target cybersecurity alert have been constructed.

Query Task Construction: Query Construction Modules

In some embodiments in which one or more query construction modules are implemented (e.g., as previously described in S220), S230 may additionally or alternatively function to implement and/or employ the one or more query construction modules to construct the one or more investigative query tasks. In such embodiments, the one or more query construction modules may function to generate one or more rendered query templates and subsequently construct one or more corresponding investigative query tasks in the same manner as previously described in S230.

As a non-limiting example, S230 may function to automatically employ the foreman, query factory modules, and query product modules previously instantiated by S220. In such an example, the vendor query product module may function to automatically generate rendered argument constructs and corresponding investigative query tasks for each query template string in a candidate vendor-specific query template in response to identifying the candidate vendor-specific query template. Additionally, in such an example, the customer query product module may function to automatically generate rendered argument constructs and corresponding investigative query tasks for each query template string in each candidate vendor sub-template of a candidate customer template in response to identifying the candidate customer template. In this example, each query product module may automatically output constructed investigative query tasks to their corresponding query factory modules (e.g., the vendor query factory module and the customer query factor module). In turn, the query factory modules may function to automatically output received constructed investigative query tasks to the foreman module.

Stated another way, in some embodiments, the system or service implementing method 200 may function to generate a security alert for a subscriber in response to assessing digital activity that is occurring or that occurred on a digital asset of the subscriber. The system or service implementing method 200 may function to execute an automated investigations protocol for the security alert in response to providing the security alert to the automated investigations protocol. The automated investigations protocol, in one or more embodiments, may function to extract, from the security alert, an alert identifier of the security alert, a third-party service (e.g., name of the third-party service) that detected the digital activity, and a globally unique identifier (GUID) that corresponds to the subscriber.

For instance, in a non-limiting example, the alert identifier extracted from the security alert may be a name of the security alert, such as "Suspicious PowerShell use," "Suspicious Lateral Movement Activity", or another suitable name. The third-party service (e.g., name of the third-party service) that detected the digital activity, in such an embodiment, may be Splunk®, Azure®, Microsoft Defender®, Crowdstrike®, any other suitable third-party security service. The globally unique identifier (GUID) that corresponds to the subscriber, in such a non-limiting example, may be a unique string of alphanumeric characters such as "5f4dcc3b5aa765d61d8327deb882cf99."

Accordingly, in one or more embodiments, in response to extracting the alert identifier of the security alert, the third-party service (e.g., name of the third-party service) that detected the digital activity, and the GUID that corresponds to the subscriber, the automated investigation protocol may function to query a hierarchical file system or data store to determine whether a subscriber-specific investigative queries file and/or a service-specific investigative queries file is stored at a location that corresponds to the extracted GUID and/or the name of the name of the third-party service. A hierarchical file system, as generally referred to herein, may refer to a directory-based storage structure in which data is organized in parent-child relationships across multiple nested levels, such that specific files or resources—like investigative query files—can be stored, located, and retrieved based on (e.g., logical) directory paths composed of identifiers such as a subscriber GUID or the name of a third-party service, as shown generally by way of example in FIG. 15.

In one or more embodiments, the hierarchical file system may include a subscriber-specific directory comprising a plurality of distinct subscriber-specific subdirectories, wherein each subscriber-specific subdirectory of the plurality of distinct subscriber-specific subdirectories is named (or encoded) according to a globally unique identifier (GUID) assigned to a respective subscriber. Furthermore, each subscriber-specific subdirectory of the plurality of distinct subscriber-specific subdirectories may store or include a queries.yml file (e.g., subscriber-specific investigative queries file). Similarly, the hierarchical file system may include a service-specific directory comprising a plurality of service-specific subdirectories, wherein each service-specific subdirectory is named (or encoded) according to a respective third-party service (e.g., "splunk," "azure", etc.) and may store or include a queries.yml file (e.g., service-specific investigative queries file).

Accordingly, in one or more embodiments, the automated investigation protocol may function to automatically detect that a first directory path that includes the GUID of the subscriber exists within the hierarchical file system and/or a second directory path comprising the name of the third-party service exists within the hierarchical file system. In such an embodiment, in response to detecting the first directory path and the second directory path exist within the hierarchical file system, the automated investigation protocol may function to automatically load, into memory, a subscriber-specific investigative queries file located within the first directory path and a service-specific investigative queries file located within the second directory path. A subscriber-specific investigative queries file, as generally referred to herein, may refer to a file that includes one or more investigative query templates that are specifically tailored to a particular subscriber's environment, infrastructure, or operational context. A service-specific investigative queries file, as generally referred to herein, may refer to a file that includes one or more investigative query templates that are designed to investigate any security alert having at least one piece of alert metadata associated with, referencing, or corresponding to the third-party service.

Accordingly, in one or more embodiments, the automated investigation protocol may function to automatically extract, from the subscriber-specific investigative queries file loaded into the memory, a plurality of subscriber-specific investigative query objects digitally mapped to the alert identifier corresponding to the security alert. For instance, in a non-limiting example, the digital asset may correspond to a computing environment of the subscriber and each subscriber-specific investigative query object included in the subscriber-specific investigative queries file may be specifically created or operably configured to investigate activity occurring within the computing environment of the subscriber that is not detectable by any threat detection rule provided by the third-party service. It shall be recognized that, in some embodiments, each distinct subscriber-specific investigative query object of the plurality of subscriber-specific investigative query objects digitally mapped to the alert identifier corresponding to the security alert may include a query template in which the query template includes a plurality of evidence data fields and a plurality of fixed tokens.

In such an embodiment, the alert identifier of the security alert may correspond to the alert name (e.g., "Suspicious PowerShell use", "Suspicious Lateral Movement Activity", etc.) of the security alert. It shall be recognized that, in some embodiments, the alert name of the security alert does not include any numeric characters.

Furthermore, in such an embodiment, the subscriber-specific investigative queries file may be structured according to a hierarchical data schema that may include a root-level data object that includes the alert name of the security alert and a nested object within the root-level object that includes the plurality of subscriber-specific investigative query objects. It shall be recognized that the plurality of subscriber-specific investigative query objects may be digitally mapped to the alert name of the security alert by being programmatically accessible through the root-level object that includes the alert name of the security alert.

Additionally, or alternatively, in some embodiments, the subscriber-specific investigative queries file may include the plurality of subscriber-specific investigative query objects digitally mapped to the alert name of the security alert and a second plurality of subscriber-specific investigative query objects that are not digitally mapped to the alert name of the security alert. In such an embodiment, the automated investigation protocol executed for the security alert may forego extracting the second plurality of subscriber-specific investigative query objects from the subscriber-specific investigative queries file based on the second plurality of subscriber-specific investigative query objects not being digitally mapped to the alert name of the security alert.

Additionally, or alternatively, in one or more embodiments, the automated investigation protocol may function to automatically extract, from the service-specific investigative queries file loaded into the memory, a plurality of service-specific investigative query objects digitally mapped to the alert identifier corresponding to the security alert. In one or more embodiments, each service-specific investigative query object included in the service-specific investigative queries file may be operably configured to investigate any security alert having at least one piece of alert metadata referencing or associated with the third-party service. It shall be recognized that, in some embodiments, each distinct service-specific investigative query object of the plurality of service-specific investigative query objects digitally mapped to the alert identifier corresponding to the security alert may include a query template in which the query template includes a plurality of evidence data fields and a plurality of fixed tokens.

Furthermore, in such an embodiment, the service-specific investigative queries file may be structured according to a hierarchical data schema that includes a root-level object that includes the alert name of the security alert and a nested object within the root-level object that includes the plurality of service-specific investigative query objects. It shall be recognized that the plurality of service-specific investigative query objects may be digitally mapped to the alert name of the security alert by being programmatically accessible through the root-level object that includes the alert name of the security alert.

Additionally, or alternatively, in some embodiments, the service-specific investigative queries file may include the plurality of service-specific investigative query objects digitally mapped to the alert name of the security alert and a second plurality of service-specific investigative query objects that are not digitally mapped to the alert name of the security alert. In such an embodiment, the automated investigation protocol executed for the security alert may foregoing extracting the second plurality of service-specific investigative query objects from the service-specific investigative queries file based on the second plurality of service-specific investigative query objects not being digitally mapped to the alert name of the security alert.

Stated another way, in one or more embodiments, the subscriber-specific investigative queries file may be structured according to a first hierarchical data schema and the service-specific investigative queries file may be structured according to a second hierarchical data schema. In such an embodiment, the first hierarchical data schema is different from the second hierarchical data schema, as shown generally by way of example in FIGS. 16 and 16A.

It shall be recognized that, in some embodiments, a respective investigative query object extracted from the subscriber-specific investigative queries file or the service-specific investigative queries file may include one or more placeholder data fields configured to be populated with evidence data extracted from the security alert. The respective investigative query object, in some embodiments, may include query logic but remains in a template state until the placeholder fields are programmatically replaced with corresponding evidence values extracted from the security alert. Once populated, the investigative query object may be transformed into a computer-executable investigation query capable of being transmitted to a target system, service, or data source to retrieve investigation findings data related to the security alert, as described in more detail herein.

Additionally, or alternatively, in one or more embodiments, the subscriber-specific investigative queries file may correspond to a first distinct Yet Another Markup Language (YAML) file and the service-specific investigative queries file may correspond to a second distinct YAML file.

2.4 Executing One or More Computer-Executable Investigative Queries Based on the One or More Investigative Query Tasks S240, which includes executing one or more computer-executable investigative queries based on the one or more investigative query tasks, may function to execute or run one or more investigative queries against one or more data sources to retrieve alert context data associated with the one or more cybersecurity alerts. In some embodiments, S240 may function to execute the one or more investigative queries automatically and/or programmatically, without requiring manual intervention. Additionally, or alternatively, in some embodiments, S240 may function to execute one or more of the investigative queries based on user input.

Query Execution Module

In one or more embodiments, S240 may function to initiate query execution by passing each constructed investigative query task, including its associated rendered argument construct (e.g., rendered query string, start time, end time), to a query execution module. In various embodiments, the query execution module may function to orchestrate final formatting of the investigative query and/or to deliver the investigative query to the appropriate endpoint for execution. In such embodiments, the query execution module may serve as a bridge between the investigative query workflow and the relevant data systems, managing query submission and result retrieval. In some such embodiments, this execution component may act as an intermediary between the investigative query workflow and external and/or internal security data platforms (e.g., log aggregation tools, endpoint detection and response (EDR) platforms, SIEM tools, or proprietary data stores). In one or more embodiments, S240 may function to implement one or more query execution modules to execute the one or more investigative queries.

In one or more embodiments, one or more (or each) investigative query task constructed in S230 may include metadata that may specify the plugin and/or capability to be used to execute the corresponding investigative query. In such embodiments, a plugin may represent a specific integration with a security technology or platform, and a capability may define the type of query or operation to be executed (e.g., "query_raw_logs" or "ariel_search"). In one or more embodiments, the query execution module may utilize plugin-capability pairing to determine how to format and where to dispatch the query.

In some embodiments, the query execution module may function to translate each investigative query task into the syntax required by the relevant vendor API, issue the query request using that vendor's protocol, and/or handle authentication, timeouts, retries, or pagination as needed. Once submitted, the investigative query task may be run by the target data platform or service, and the results may be returned for further processing or presentation.

Additionally, or alternatively, in some embodiments, the one or more investigative query tasks may be submitted using one or more application programming interfaces (APIs) or native connectors, depending on the technology associated with the query template. For example, an investigative query task may be executed through a vendor's proprietary API using the required plugin and capability definition.

In some embodiments, each executed query task may target a specific dataset and/or log repository and request data for a defined time window, using filters constructed from the evidence data extracted from the alert. These filters may include one or more field-value comparisons (e.g., username="jdoe", file_hash="abc123", etc.), time-based conditions, and/or logical groupings (e.g., IP1 OR IP2).

In one or more implementations, the S240 may function to execute multiple investigative queries in parallel, particularly when more than one query template has been identified (e.g., both a customer-specific and a vendor-specific template). In such embodiments, this parallel execution approach may minimize response latency and provide faster access to the relevant investigative results. Additionally, or alternatively, S240 may function to execute multiple investigative queries in series (e.g., sequentially). Additionally, or alternatively, S240 may function to execute multiple investigative queries both in series and in parallel.

Alert Context Data Retrieval

Preferably, S240 may function to execute the one or more investigative queries to retrieve alert context data (e.g., investigation findings data). As previously described, alert context data may include data that provides insight and/or supports evidence associated with a cybersecurity alert. For example, alert context data may include data associated with network activity, user behavior, process execution, file access events, and/or any other data or metadata that may provide context for a cybersecurity alert.

In one or more embodiments, as each investigative query completes, the retrieved alert context data may be collected and formatted for later consumption by the cybersecurity event detection and response service and/or by an analyst or other end user. In various embodiments, query execution success or failure may be monitored, logged, and potentially retried based on predefined policies or thresholds.

Accordingly, in some embodiments, S240 may enable programmatic interaction with distributed data sources to extract high-value contextual information relevant to a detected cybersecurity alert or threat. In such embodiments, this automation may support rapid investigation and may reduce the need for analysts to manually pivot between systems or construct complex queries on demand.

Stated another way, in one or more embodiments, in response to executing the first plurality of computer-executable investigation queries and the second plurality of computer-executable investigation queries, the automated investigation protocol may function to obtain a corpus of investigation findings data indicative of whether the security alert corresponds to a security threat or a benign security alert. The corpus of investigation findings data, in such an embodiment, may include all data and artifacts obtained as a result of executing the first plurality of computer-executable investigation queries (e.g., subscriber-specific investigation queries) and the second plurality of computer-executable investigation queries (e.g., service-specific investigation queries), such as: raw log data; structured event records; network flow records; process execution details; process tree hierarchies; command-line arguments; file creation events, file modification events, and file deletion events; cryptographic file hashes (e.g., MD5, SHA-1, SHA-256); file path information; registry key creation or modification events; authentication and login events; user session data; account privilege changes; access control list modifications; endpoint configuration changes; running service inventories; network connection attempts; successful and failed connection attempts; Domain Name System (DNS) query and response data; HyperText Transfer Protocol (HTTP) request and response data; email metadata (e.g., sender, recipient, subject, headers); message body excerpts; uniform resource locator (URL); click-through events; cloud application programming interface (API) invocation records; virtual machine creation or snapshot events; container deployment or runtime logs; security tool alert telemetry; data exfiltration indicators; anomalous data transfer volumes; geolocation metadata for network activity; time-series metrics for central processing unit (CPU), memory, or disk usage; packet capture (PCAP) summaries; and any other contextually relevant digital artifact retrievable by the computer-executable investigative queries.

It shall be recognized that, in one or more embodiments, the first plurality of computer-executable investigation queries and the second plurality of computer-executable investigation queries may be simultaneously executed. In such an embodiment, executing one of the first plurality of computer-executable investigation queries may include one or more of (e.g., automatically) creating a first application programming interface (API) call operably configured to retrieve a first set of investigation findings data from the third-party service, (e.g., automatically) creating a second API call operably configured to retrieve a second set of investigation findings data from a second third-party service different from the third-party service, (e.g., automatically) transmitting, over a computer network, the first API call to an API endpoint provided by the third-party service, and transmitting, over the computer network, the second API call to an API endpoint provided by the second third-party service. Additionally, or alternatively, in one or more embodiments, executing one of the second plurality of computer-executable investigation queries may include one or more of creating a third API call operably configured to retrieve a third set of investigation findings data from the third-party service and transmitting, over the computer network, the third API call to the API endpoint provided by the third-party service. It shall be recognized that, in such embodiments, the corpus of investigation findings data may include the first set of investigation findings data, the second set of investigation findings data, and the third set of investigation findings data in response to executing the one of the first plurality of computer-executable investigation queries and the one of the second plurality of computer-executable investigation queries.

In one or more embodiments, in response to extracting the plurality of subscriber-specific investigative query objects from the subscriber-specific investigative queries file, the automated investigation protocol may function to automatically construct a first plurality of computer-executable investigation queries using the plurality of subscriber-specific investigative query objects and a first subset of evidence data included in the security alert, as shown generally by way of example in FIG. 16B. For instance, in a non-limiting example, automatically constructing a respective computer-executable investigation query of the first plurality of computer-executable investigation queries may include one or more of extracting, from the subscriber-specific investigative queries file, a plugin attribute (e.g., splunk: 1.0.0, qradar:1.0.0, etc.) specifying a target third-party service and a version of the target third-party service on which the respective computer-executable investigation query is to be executed; extracting, from the subscriber-specific investigative queries file, a capability attribute (e.g, query_raw_logs, ariel_search, etc.) specifying a type of query operation to be executed by the target third-party service; extracting, from the subscriber-specific investigative queries file, a start time value (e.g., −15 m) specifying a first amount of time, extracting, from the subscriber-specific investigative queries file, an end time value (e.g., 15 m) specifying a second amount of time, obtaining a target subscriber-specific investigative query object of the plurality of subscriber-specific investigative query objects extracted from the subscriber-specific investigative queries file, wherein the target subscriber-specific investigative query object includes a query template that includes a plurality of evidence data fields and a plurality of fixed tokens; converting the query template to an alert-specific query by automatically populating each evidence data field of the plurality of evidence data fields with a respective piece of evidence data (e.g., hostname value, internet protocol (IP) address value, username value, an email address value, a file path value, a process name value, a process path value, a uniform resource locator (URL) value, etc.) included in the first subset of evidence data; and creating, based on application programming interface (API) protocols specified by the target third-party service, an API call that includes a representation of the plugin attribute, a representation of the capability attribute, the alert-specific query, and a query time range determined based on the start time value and the end time value. It shall be recognized that, in such an embodiment, the target third-party service may be different from the third-party service that detected the digital activity.

It shall be further recognized that a query time range, as generally referred to herein, may be determined by calculating an actual start time and an actual end time based on one or more time offsets (e.g., a start time value, an end time value, etc.) relative to a reference time associated with the security alert (e.g., the alert generation time). For example, if the alert was generated at 2025 Aug. 12 14:30:00 UTC, a start time offset of "−15 m" results in an actual start time of 2025 Aug. 12 14:15:00 UTC, and an end time offset of "1 d" results in an actual end time of 2025 Aug. 13 14:30:00 UTC. In some embodiments, the offsets may be expressed in days ("d"), hours ("h"), minutes ("m"), and/or seconds ("s"), and a positive or negative operator may be used to indicate whether the offset is added to or subtracted from the reference time.

In one or more embodiments, executing the first plurality of computer-executable investigation queries may include at least transmitting, over a computer network, the API call to an API endpoint provided by the target third-party service. Accordingly, in one or more embodiments, in response to transmitting the API call to the API endpoint provided by the target third-party service, the automated investigation protocol may function to obtain or receive investigation findings data returned from the target third-party service in response to the execution of the alert-specific query. The investigation findings data may include raw logs, structured event records, telemetry metrics, or other relevant data associated with the time span and parameters specified in the API call and/or the alert-specific query. It shall be further recognized that, in some embodiments, the investigation findings data retrieved from the target third-party service may include a first set of raw logs that occurred before the security alert was generated and a second set of raw logs that occurred after the security alert was generated.

Additionally, or alternatively, in one or more embodiments, in response to extracting the plurality of service-specific investigative query objects from the service-specific investigative queries file, the automated investigation protocol may function to automatically construct a second plurality of computer-executable investigation queries using the plurality of service-specific investigative query objects and a second subset of evidence data included in the security alert. For instance, in a non-limiting example, automatically constructing a respective computer-executable investigation query of the second plurality of computer-executable investigation queries may include one or more of extracting, from the service-specific investigative queries file, a plugin attribute (e.g., splunk:1.0.0, qradar:1.0.0, etc.) specifying the third-party service and a version of the third-party service on which the respective computer-executable investigation query is to be executed; extracting, from the service-specific investigative queries file, a capability attribute (e.g, query_raw_logs, ariel_search, etc.) specifying a type of query operation to be executed by the third-party service; extracting, from the service-specific investigative queries file, a start time value specifying a first amount of time (e.g., fifteen minutes, three days), extracting, from the service-specific investigative queries file, an end time value specifying a second amount of time (e.g., fifteen minutes, three days), obtaining a target service-specific investigative query object of the plurality of service-specific investigative query objects extracted from the service-specific investigative queries file, wherein the target service-specific investigative query object includes an query template that includes a plurality of evidence data fields and a plurality of fixed tokens; converting the query template to an alert-specific query by automatically populating each evidence data field of the plurality of evidence data fields with a respective piece of evidence data (e.g., hostname value, internet protocol (IP) address value, username value, an email address value, a file path value, a process name value, a process path value, a uniform resource locator (URL) value, etc.) included in the second subset of evidence data; and creating, based on application programming interface (API) protocols specified by the third-party service, an API call that includes a representation of the plugin attribute, a representation of the capability attribute, the alert-specific query, and a query time range determined based on the start time value and the end time value.

It shall be further recognized that a query time range, in such an embodiment, may be determined by calculating an actual start time and an actual end time based on one or more time offsets (e.g., a start time value, an end time value, etc.) relative to a reference time associated with the security alert (e.g., the alert generation time). For example, if the alert was generated at 2025 Aug. 12 14:30:00 UTC, a start time offset of "−15 m" results in an actual start time of 2025 Aug. 12 14:15:00 UTC, and an end time offset of "1 d" results in an actual end time of 2025 Aug. 13 14:30:00 UTC. In some embodiments, the offsets may be expressed in days ("d"), hours ("h"), minutes ("m"), and/or seconds ("s"), and a positive or negative operator may be used to indicate whether the offset is added to or subtracted from the reference time.

In one or more embodiments, executing the second plurality of computer-executable investigation queries may include at least transmitting, over a computer network, the API call to an API endpoint provided by the third-party service. Accordingly, in such an embodiment, in response to transmitting the API call to the API endpoint provided by the third-party service, the automated investigation protocol may function to obtain or receive investigation findings data returned from the third-party service in response to the execution of the alert-specific query. The investigation findings data, in such an embodiment, may include a first set of raw logs that occurred before the security alert was generated and a second set of raw logs that occurred after the security alert was generated.

2.5 Surfacing Alert Context Data Based on the One or More Investigative Queries

S250, which includes surfacing alert context data based on the one or more investigative queries, may function to surface or output alert context data retrieved by the one or more executed investigative queries. In one or more embodiments, S250 may function to surface the alert context data to a graphical user interface (GUI) that may be accessible to one or more users (e.g., SOC analysts) of the cybersecurity event detection and response service. In one or more embodiments, the alert context data may provide valuable context that may support cybersecurity alert triage, investigation, and/or decision-making.

In one or more embodiments, after one or more investigative queries have been executed (as described in S240), the resulting alert context data (e.g., DNS records, process trees, login locations, or file activity) may be captured by the S250 and prepared for presentation in a structured format. In some embodiments, this alert context data may be filtered, formatted, and/or transformed as necessary to ensure clarity and relevance for end users.

In one or more embodiments, S250 may function to surface the alert context data to a GUI, such as a security operations platform dashboard and/or alert detail view. In some embodiments, S250 may function to group and display alert context data in association with the corresponding cybersecurity alert and/or the original alert(s) that may have triggered the investigative query workflow. In some embodiments, as shown by way of example in FIG. 13, each investigative query result may be presented as a self-contained data card or tabular panel, with a question-style heading, such as "What region does user@example.com typically login from?", and an associated data table showing the relevant alert-context data returned from the corresponding executed investigative query. In the example of FIG. 13, the relevant alert-context data retrieved from the executed investigative queries includes initial occurrence timestamps, latest occurrence timestamps, region data (e.g., city, state, country, and/or the like), enumeration or count values, and percent use values. In this example, S250 may function to automatically arrange the retrieved alert-context data in a table, as shown in FIG. 13.

In various embodiments, each data card, tabular panel, UI tile, or the like associated with a distinct investigative query may include the investigative query and/or a description of the investigative query (e.g., a question-style heading or text label), any alert context data retrieved by the investigative query (e.g., IP addresses, usernames, file hashes, and/or any other alert context data), the time window covered by the query (e.g., start time and/or end time), the source technology or plugin associated with the investigative query or the cybersecurity alert corresponding to the investigative query, and/or any other data associated with the investigative query.

In one or more embodiments, S250 may function to visually group or categorize the surfaced investigative queries and alert context data by investigative query type (e.g., vendor-based or customer-specific investigative queries), and/or by the type of alert context data retrieved (e.g., network activity, user behavior, file access, and/or the like). In some embodiments, the alert context data surfaced by S250 may be interactive. That is, in some embodiments, S250 may function to enable user interaction with the surface alert context data. For example, in some embodiments, an order (e.g., sorting order) of alert context data may be selected by a user. Additionally, in some implementations, In some embodiments, S250 may additionally function to surface an indication of how many investigative queries were executed in the GUI. Additionally, or alternatively, in one or more embodiments, S250 may function to surface a visual or textual summary of the status of each investigative query (e.g., completed, failed, pending). In such embodiments, this may enable users to understand which alert contextual data is available without manually navigating to each investigative query or each cybersecurity alert in the user interface, and/or without rerunning investigative queries.

Additionally, or alternatively, in one or more embodiments, based on or in response to retrieving the corpus of investigation findings data for a target security alert, the system or service implementing method 200 may function to display, via a graphical user interface, the target security alert (or a representation of the target security alert) in association with the corpus of investigation findings data retrieved for the target security alert. The graphical user interface, in some embodiments, may enable a user to detect, based on an assessment of the graphical user interface, whether the target security alert corresponds to one of a security threat or a benign security alert.

In one or more embodiments, based on or in response to assessing the graphical user interface or the target security alert in association with the corpus of investigation findings data, the target security alert may be detected as the benign security alert. In such an embodiment, the system or service implementing method 200 may function to receive, via the graphical user interface, an input selecting a close alert button displayed on the graphical user interface. Accordingly, in response to receiving the input selecting the close alert button displayed on the graphical user interface, the system or service implementing method 200 may function to automatically close, in real-time, the target security alert. It shall be recognized that, in such an embodiment, automatically closing the target security alert may include automatically attributing, in real-time, a benign alert tag to the target security alert and/or automatically routing the target security alert from a pending security alert queue to a security alert disposal queue, wherein each security alert included in the pending security alert queue is awaiting an alert triage.

Conversely, in one or more embodiments, based on or in response to assessing the graphical user interface or the target security alert in association with the corpus of investigation findings data, the target security alert may be detected or identified as the security threat. In such an embodiment, in response to detecting the target security alert corresponds to the security threat, the system or service implementing method 200 may function to execute, in real-time or near real-time, a threat mitigation action (e.g., service-proposed threat mitigation action or the like) that, when executed, automatically mitigates the security threat for the subscriber associated with the target security alert. It shall be recognized that the system or service implementing method 200 may function to receive, via the graphical user interface, an input from the subscriber selecting a user interface (UI) object or component displayed on the graphical user interface and, in turn, the system or service implementing method 200 may function to commence automated execution of the threat mitigation action in response to receiving the input from the subscriber selecting the UI object, as described in more detail herein.

It shall be recognized that, in one or more embodiments, before executing the threat mitigation action, the security threat may remain active, accessible, or otherwise capable of causing harm to one or more computing resources, computing environments, network assets, and/or user accounts associated with the subscriber. Conversely, after executing the threat mitigation action, the security threat may be neutralized, contained, or removed such that the security threat no longer poses a security risk to the subscriber's system(s), computing environment(s) or data.

For instance, with continued reference to the above non-limiting examples and embodiments, the system or service implementing method 200 may function to perform an automated security investigation into the security alert in response to executing the first plurality of computer-executable investigation queries and the second plurality of computer-executable investigation queries. The first plurality of computer-executable investigation queries, in one or more embodiments, may be operably configured to investigate a first distinct security investigation question (e.g., single security investigation question) such as "What region does user@example.com typically login from?," "What do we know about IP address 192.168.1.1?", "What hours of the day does user@acme.com normally login in?", "What other accounts did IP address 192.168.1.1 login or attempt to login to?, "What user agent does user@example.com typically use?," Has the login activity been consistent for user@example.com?". The second plurality of computer-executable investigation queries, in one or more embodiments, may be operably configured to investigate a second distinct security investigation question different from the first distinct security investigation question. A security investigation question, as generally referred to herein, may include an interrogative pronoun (e.g., who, which, whom, whose, what, etc.) at a beginning (e.g., start) of a subject security investigation question and conclude (e.g., end) with a question mark (e.g., "?"), and is configured to communicate the context and/or focus of the corresponding investigation findings data positioned and/or displayed below a respective security investigation question within the graphical user interface.

Accordingly, in such an embodiment, the system or service implementing method 200 may function to obtain a first subset of investigation findings data in response to executing the first plurality of computer-executable investigation queries. The first subset of investigation findings data may include investigation findings data that may answer the first distinct security investigation question. Stated differently, the corpus of investigation findings data may include the first subset of investigation findings data.

In such an embodiment, based on or in response to obtaining the first subset of investigation findings data, the system or service implementing method 200 may function to automatically generate a first data table that includes the investigation findings data of the first subset of investigation findings data that answers the first distinct security investigation question and/or automatically generate a first user interface (UI) tile that includes the first distinct security investigation question and the first data table. Accordingly, in one or more embodiments, the system or service implementing method 200 may function to display the first UI tile on the graphical user interface (or any other suitable graphical user interface described herein). It shall be recognized that, in one or more embodiments, the first data table may be positioned below the first distinct security investigation question within the first UI tile.

Additionally, or alternatively, in one or more embodiments, the system or service implementing method 200 may function to obtain a second subset of investigation findings data in response to executing the second plurality of computer-executable investigation queries. The second subset of investigation findings data may include investigation findings data that may answer the second distinct security investigation question. Stated differently, the corpus of investigation findings data may include the second subset of investigation findings data.

In such an embodiment, based on or in response to obtaining the second subset of investigation findings data, the system or service implementing method 200 may function to automatically generate a second data table that includes the investigation findings data of the second subset that answers the second distinct security investigation question and/or automatically generate a second UI tile that includes the second distinct security investigation question and the second data table. Accordingly, in one or more embodiments, the system or service implementing method 200 may further function to display the second UI tile on the graphical user interface (or any other suitable graphical user interface described herein). It shall be recognized that, in one or more embodiments, the second data table may be positioned below the second distinct security investigation question within the second UI tile.

It shall be further recognized that, in one or more embodiments, the graphical user interface may concurrently display five, ten, hundreds, or even thousands of distinct UI tiles, each UI tile respectively corresponding to a distinct security investigation question and its associated investigation findings data. In such embodiments, the plurality of distinct UI tiles may be presented simultaneously or in a scrollable, paginated, or otherwise navigable format, thereby enabling a user to review, compare, and interact with multiple investigation findings data sets within a single graphical user interface.

Stated another way, in one or more embodiments, with continued reference to the above non-limiting examples and embodiments, the digital asset may include an endpoint of the subscriber, and the digital activity may relate to a process (e.g., computer process, or any other suitable process) running (e.g., executing or the like) on the endpoint of the subscriber. The security alert generated for the subscriber, in such an embodiment, may not include any metadata or pieces of evidence indicating whether the process running on the endpoint of the subscriber initiated any domain name system (DNS) queries, which may be indicative of whether the process was involved or engaged in suspicious or malicious activity.

In one or more embodiments, at least one of the first plurality of computer-executable investigation queries or the second plurality of computer-executable investigation queries may be operably configured to answer a DNS-related security investigation question (e.g., "What DNS queries did the process make?"). In such an embodiment, in response to executing the at least one of the first plurality of computer-executable investigation queries or the second plurality of computer-executable investigation queries, the system or service implementing method 200 may function to obtain investigation findings data (e.g., evidence data or the like) that answers the DNS-related security investigation question. Stated another way, a subset of the corpus of investigation findings data may include a set of DNS queries that were initiated by the process running on the endpoint of the subscriber.

In one or more embodiments, in response to obtaining the subset of the corpus of investigation findings data that answers the DNS-related security investigation question, the system or service implementing method 200 may function to automatically generate a user interface (UI) component (e.g., UI tile or the like) that includes the DNS-related security investigation question and the set of DNS queries that were initiated by the process running the endpoint of the subscriber. The generated UI component, in some embodiments, may include the DNS-related security investigation question positioned above the set of DNS queries. It shall be further recognized that, in some embodiments, displaying the security alert in association with the corpus of investigation findings data on the graphical user interface may include the UI component (e.g., UI tile) in association with the security alert on the graphical user interface.

Additionally, or alternatively, in one or more embodiments, based on or in response to detecting the set of DNS queries initiated by the process includes at least one DNS query to a malicious domain, the system or service implementing method 200 may function to (e.g., automatically) terminate, in real-time or near real-time, the process running on the endpoint of the subscriber. In other words, in some embodiments, the detection of a DNS query to a known malicious or otherwise suspicious domain may trigger an automated mitigation action that prevents further execution of the process, thereby reducing the risk of data exfiltration, command-and-control (C2) communications, or other malicious network activity.

Additionally, or alternatively, in one or more embodiments, at least one of the first plurality of computer-executable investigation queries or the second plurality of computer-executable investigation queries may be operably configured to answer a user-related security investigation question (e.g., "What hours of the day does user@acme.com normally login in?," ""What user agent does user@example.com typically use?," Has the login activity been consistent for user@example.com?"). In such an embodiment, in response to executing the at least one of the first plurality of computer-executable investigation queries or the second plurality of computer-executable investigation queries, the system or service implementing method 200 may function to obtain investigation findings data (e.g., evidence data or the like) that answers the user-related security investigation question. Stated another way, a subset of the corpus of investigation findings data may include evidence data obtained and/or derived from one or more third-party services (e.g., a plurality of distinct third-party security services, one or more data sources, a plurality of distinct data sources, etc.) that answers, directly addresses, and/or resolves the user-related security investigation question. Such evidence data may include, but is not limited to, timestamps, geolocation data, device identifiers, network attributes, authentication details, and behavioral metrics associated with the user's historical and recent activity, which may be presented within the graphical user interface in association with the user-related security investigation question.

In one or more embodiments, in response to obtaining the subset of the corpus of investigation findings data that answers the user-related security investigation question, the system or service implementing method 200 may function to automatically generate a user interface (UI) component (e.g., UI tile or the like) that includes the user-related security investigation question and a representation of the subset of the corpus of investigation findings data that answers the user-related security investigation question. The representation of the subset of the corpus of investigation findings data may include tabular data, graphical elements, interactive user interface elements, interactive visualizations, charts or other any suitable structured visualization that enable the subscriber to quickly interpret the investigation findings data and determine whether the associated security alert is a security threat or a benign security alert. The generated UI component, in some embodiments, may include the user-related security investigation question positioned above the subset of the corpus of investigation findings data that answers the user-related security investigation question. It shall be further recognized that, in some embodiments, displaying the security alert in association with the corpus of investigation findings data on the graphical user interface may include the UI component (e.g., UI tile) in association with the security alert on the graphical user interface.

Additionally, or alternatively, in one or more embodiments, based on or in response to detecting the subset of the corpus of investigation findings data answering the user-related security investigation question indicates anomalous, suspicious, or other malicious user activity, the system or service implementing method 200 may function to (e.g., automatically) execute, in real-time or near real-time, one or more (e.g., automated) threat mitigation actions. Such automated threat mitigation actions may include, but are not limited to, disabling or locking a user account that corresponds to the compromised user account to prevent any further unauthorized access, terminating active sessions associated the compromised user account, resetting user account credentials to render compromised authentication factors unusable, and restricting network access for the user account to prevent lateral movement or data exfiltration.

As described above, in one or more embodiments, a set of UI tiles (e.g., one UI tile, two UI tiles, three UI tiles, ten UI tiles, twenty UI tiles, etc.) may be displayed on a graphical user interface in association with a security alert. In such an embodiment, each UI tile of the set of UI tiles may include a distinct security investigation question and a corresponding data table that includes investigation findings data or a derived representation of the investigation findings data that answers the distinct security investigation question.

In such an embodiment, the system or service implementing method 200 may function to receive an input (e.g., via a mouse click, touch input, etc.) selecting the distinct security investigation question within a respective UI tile. In one or more embodiments, in response to receiving the input selecting the distinct security investigation question within the respective UI tile, the system or service implementing method 200 may function to execute, in real-time or near real-time, a threat mitigation action digitally tied, digitally coupled, or digitally associated to the selected security investigation question.

For instance, in a non-limiting example, the security alert generated by the system or service implementing method 200 may include a network host of the subscriber. In such a non-limiting example, a graphical user interface may include the security alert in association with a respective UI tile that includes a security investigation question related to the network host and a data table that includes investigation findings data answering the security investigation question related to the network host. Accordingly, in one or more embodiments, the system or service implementing method 200 may function to receive an input selecting the security investigation question or any portion (e.g. a cell, a column, a row, etc.) of the data table and, in turn, the system or service implementing method 200 may function to execute, in real-time or near real-time, an automated threat mitigation action digitally coupled, associated, tied, or mapped to the security investigation question or the data table. Such automated threat mitigation action may include, for example, automatically terminating existing network connections on the network host included in the security alert and preventing new network connections from digitally communicating with the network host included in the security alert.

In another non-limiting example, a security alert generated by the system or service implementing method 200 may include a user account of the subscriber and a computing environment of the subscriber. In such a non-limiting example, a graphical user interface may include the security alert in association with a respective UI tile that includes a security investigation question related to the user account and a data table that includes investigation findings data answering the security investigation question related to the user account. Accordingly, in one or more embodiments, the system or service implementing method 200 may function to receive an input selecting the security investigation question or any portion (e.g., a cell, a column, a row, etc.) of the data table and, in turn, the system or service implementing method 200 may function to execute, in real-time or near real-time, an automated threat mitigation action digitally coupled, associated, tied, or mapped to the security investigation question or the data table. Such an automated threat mitigation action may include, for example, automatically disabling the user account included in the security alert to temporarily or permanently prevent unauthorized access to the computing environment of the subscriber.

In another non-limiting example, a security alert generated by the system or service implementing method 200 may include data associated with an application, a respective hash signature of the application, and/or a representation of a digital environment in which the application was executed. In such a non-limiting example, a graphical user interface may include the security alert in association with a respective UI tile that includes a security investigation question related to the application or the hash signature of the application and a data table that includes investigation findings data answering the security investigation question related to the application or the hash signature. Accordingly, in one or more embodiments, the system or service implementing method 200 may function to receive an input selecting the security investigation question or any portion (e.g., a cell, a column, a row, etc.) of the data table and, in turn, the system or service implementing method 200 may function to execute, in real-time or near real-time, an automated threat mitigation action digitally coupled, associated, tied, or mapped to the security investigation question or the data table. Such an automated threat mitigation action may include, for example, automatically blocking the respective hash signature included in the security alert to prevent the application associated with the respective hash signature from being re-executed within the digital environment of the subscriber.

In another non-limiting example, a security alert generated by the system or service implementing method 200 may include data associated with a cloud computing environment of the subscriber. In such a non-limiting example, a graphical user interface may include the security alert in association with a respective UI tile that includes a security investigation question related to the cloud computing environment and a data table that includes investigation findings data answering the security investigation question related to the cloud computing environment. Accordingly, in one or more embodiments, the system or service implementing method 200 may function to receive an input selecting the security investigation question or any portion (e.g., a cell, a column, a row, etc.) of the data table and, in turn, the system or service implementing method 200 may function to execute, in real-time or near real-time, an automated threat mitigation action digitally coupled, associated, tied, or mapped to the security investigation question or the data table. Such an automated threat mitigation action may include, for example, automatically terminating the cloud computing environment of the subscriber to suspend or cease digital events from occurring on the cloud computing environment.

Figure 17:
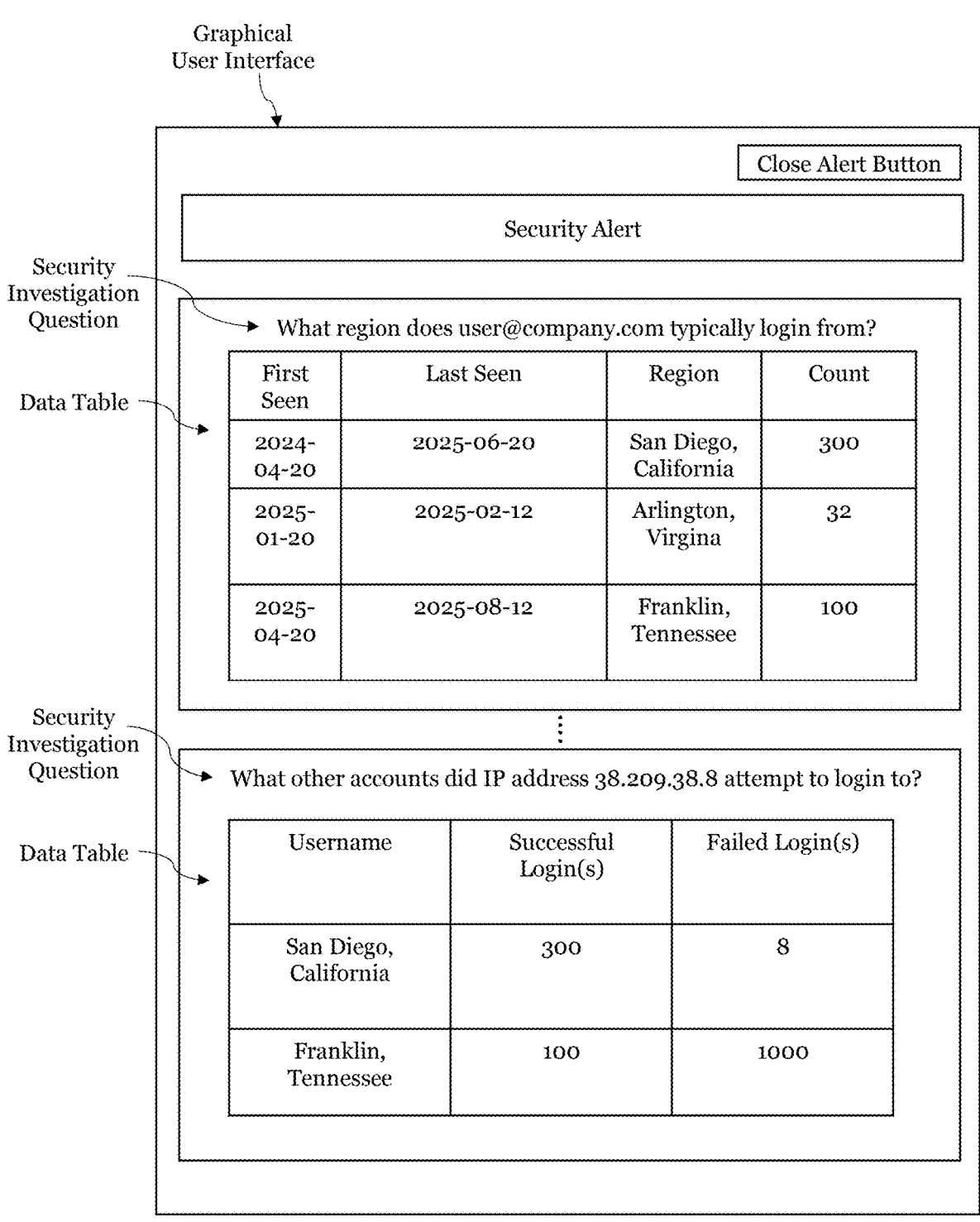
FIG. 17 illustrates an example of a graphical user interface in accordance with one or more embodiments of the present application.

It shall be recognized that, in one or more embodiments, the graphical user interface described herein may include a plurality of distinct UI tiles, wherein each UI tile of the plurality of distinct UI tiles may include a respective security investigation question and a corresponding representation of a subset of investigation findings data that answers the respective security investigation question, as shown generally by way of example in FIG. 17. Each distinct UI tile, in one or more embodiments, may be digitally coupled, associated, tied, or mapped to a single automated threat mitigation action that is contextually relevant to the displayed investigation findings data and/or the respective security investigation question. In some embodiments, the graphical user interface may enable a user (e.g., security analyst or the like) to execute any automated threat mitigation action associated with a selected UI tile and may further allow the user to execute multiple such automated threat mitigation actions in sequence or combination from the same graphical user interface. Such a graphical user interface may enable a user to perform multiple targeted threat mitigation actions in rapid succession-such as disabling a user account, blocking execution of a malicious application, or terminating a compromised computing environment within a single graphical user interface and without having to navigate away from the single graphical user interface.

Additionally, or alternatively, in one or more embodiments, the system or service implementing method 200 may function to automatically generate a security alert for a subscriber in response to assessing digital activity that occurred on a digital asset of the subscriber and, in turn, execute an automated investigation protocol for the security alert in response to providing, as input, the security alert to the automated investigation protocol. In such an embodiment, executing the automated investigation protocol may include one or more of (a) automatically extracting, from the security alert, an alert identifier of the security alert, a name of a third-party service that detected the digital activity, and a globally unique identifier (GUID) that corresponds to the subscriber; (b) automatically detecting that (i) a first directory path comprising the GUID exists within a hierarchical file system and (ii) a second directory path comprising the name of the third-party service exists within the hierarchical file system; (c) in response to detecting the first directory path and the second directory path exist within the hierarchical file system, automatically loading, into memory, a subscriber-specific investigative queries file located within the first directory path and a service-specific investigative queries file located within the second directory path; (d) automatically extracting, from the subscriber-specific investigative queries file loaded into the memory, a plurality of subscriber-specific investigative query objects digitally mapped to the alert identifier corresponding to the security alert; (e) in response to extracting the plurality of subscriber-specific investigative query objects, automatically constructing a first plurality of computer-executable investigation queries using the plurality of subscriber-specific investigative query objects and a first subset of evidence data included in the security alert; (f) automatically extracting, from the service-specific investigative queries file loaded into the memory, a plurality of service-specific investigative query objects digitally mapped to an alert-agnostic text string; (g) in response to extracting the plurality of service-specific investigative query objects, automatically constructing a second plurality of computer-executable investigation queries using the plurality of service-specific investigative query objects and a second subset of evidence data included in the security alert; and (h) obtaining, in response to executing the first plurality of computer-executable investigation queries and the second plurality of computer-executable investigation queries, a corpus of investigation findings data indicative of whether the security alert corresponds to a security threat or a benign security alert. Additionally, in such an embodiment, the system or service implementing method 200 may function to display, via a graphical user interface, the security alert in association with the corpus of investigation findings data.

It shall be recognized that, in such an embodiment, the service-specific investigative queries file may include a root-level object that includes the alert-agnostic text string and a nested object within the root-level object that includes the plurality of service-specific investigative query objects. Additionally, or alternatively, in such an embodiment, the root-level object that includes the alert-agnostic text string may include all service-specific investigative query objects useable for any security alert having at least one piece of alert metadata referencing, identifying, or associated with the third-party service. It shall be recognized that, in some embodiments, the plurality of service-specific investigative query objects may be digitally mapped to the alert-agnostic text string by being programmatically accessible through the root-level object that includes the alert-agnostic text string. It shall be further recognized that the alert-agnostic text string may only include or have three characters (e.g., "all", etc.).

Stated another way, in one or more embodiments, the service-specific investigative queries file may include a universal set of investigative query objects that are usable for any security alert referencing, identifying, or otherwise associated with the third-party service. This may enable the automated investigation protocol to combine subscriber-specific investigative queries, specifically tailored to the subscriber's environment, with service-specific investigative queries, broadly applicable to all alerts referencing the third-party service. As a result, the system or service implementing method 200 can more quickly automatically execute the applicable investigative queries, automatically retrieve the corresponding investigation findings data, and reduce the time to detect and resolve security alerts.

3. Computer-Implemented Method and Computer Program Product

Embodiments of the system and/or method can include every combination and permutation of the various system components and the various method processes, wherein one or more instances of the method and/or processes described herein can be performed in real-time or near real-time, asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although omitted for conciseness, the embodiments include every combination and permutation of the implementations of the systems and methods described herein. Furthermore, each method step, process step, or the like described herein may be performed in real-time or near real-time.

As a person skilled in the art will recognize from the previous detailed description and from the figures and claims, modifications and changes can be made to the preferred embodiments of the invention without departing from the scope of this invention defined in the following claims.

We claim:

1. A computer-implemented method comprising:

generating a security alert for a subscriber in response to assessing digital activity that occurred on a digital asset of the subscriber;

executing an automated investigation protocol for the security alert in response to providing, as input, the security alert to the automated investigation protocol, wherein executing the automated investigation protocol includes:

automatically extracting, from the security alert, an alert identifier of the security alert, a third-party service that detected the digital activity, and a globally unique identifier (GUID) that corresponds to the subscriber;

automatically detecting that (i) a first directory path comprising the GUID exists within a hierarchical file system and (ii) a second directory path comprising a name of the third-party service exists within the hierarchical file system;

in response to detecting the first directory path and the second directory path exist within the hierarchical file system, automatically loading, into memory, a subscriber-specific investigative queries file located within the first directory path and a service-specific investigative queries file located within the second directory path;

automatically extracting, from the subscriber-specific investigative queries file loaded into the memory, a plurality of subscriber-specific investigative query objects digitally mapped to the alert identifier corresponding to the security alert;

in response to extracting the plurality of subscriber-specific investigative query objects, automatically constructing a first plurality of computer-executable investigation queries using the plurality of subscriber-specific investigative query objects and a first subset of evidence data included in the security alert;

automatically extracting, from the service-specific investigative queries file loaded into the memory, a plurality of service-specific investigative query objects digitally mapped to the alert identifier corresponding to the security alert;

in response to extracting the plurality of service-specific investigative query objects, automatically constructing a second plurality of computer-executable investigation queries using the plurality of service-specific investigative query objects and a second subset of evidence data included in the security alert;

obtaining, in response to executing the first plurality of computer-executable investigation queries and the second plurality of computer-executable investigation queries, a corpus of investigation findings data indicative of whether the security alert corresponds to a security threat or a benign security alert; and displaying, via a graphical user interface, the security alert in association with the corpus of investigation findings data.

2. The computer-implemented method according to claim 1, wherein:

the alert identifier of the security alert corresponds to an alert name of the security alert, the subscriber-specific investigative queries file includes the plurality of subscriber-specific investigative query objects digitally mapped to the alert name of the security alert and a second plurality of subscriber-specific investigative query objects that are not digitally mapped to the alert name of the security alert, the service-specific investigative queries file includes the plurality of service-specific investigative query objects digitally mapped to the alert name of the security alert and a second plurality of service-specific investigative query objects that are not digitally mapped to the alert name of the security alert, and the computer-implemented method further includes:

foregoing extracting the second plurality of subscriber-specific investigative query objects from the subscriber-specific investigative queries file based on the second plurality of subscriber-specific investigative query objects not being digitally mapped to the alert name of the security alert, and foregoing extracting the second plurality of service-specific investigative query objects from the service-specific investigative queries file based on the second plurality of service-specific investigative query objects not being digitally mapped to the alert name of the security alert.

3. The computer-implemented method according to claim 1, wherein:

the digital asset corresponds to a computing environment of the subscriber, each subscriber-specific investigative query object included in the subscriber-specific investigative queries file is specifically created to investigate activity occurring within the computing environment of the subscriber that is not detectable by any threat detection rule provided by the third-party service, and each service-specific investigative query object included in the service-specific investigative queries file is operably configured to investigate any security alert having at least one piece of alert metadata referencing the third-party service.

4. The computer-implemented method according to claim 1, wherein:

the alert identifier of the security alert corresponds an alert name of the security alert, the alert name of the security alert does not include any numeric characters, the subscriber-specific investigative queries file is structured according to a hierarchical data schema, wherein the subscriber-specific investigative queries file includes:

a root-level object that includes the alert name of the security alert, and a nested object within the root-level object that includes the plurality of subscriber-specific investigative query objects, and the plurality of subscriber-specific investigative query objects are digitally mapped to the alert name of the security alert by being programmatically accessible through the root-level object that includes the alert name of the security alert.

5. The computer-implemented method according to claim 1, wherein:

the alert identifier of the security alert corresponds an alert name of the security alert, the service-specific investigative queries file is structured according to a hierarchical data schema, wherein the service-specific investigative queries file includes:

a root-level object that includes the alert name of the security alert, and a nested object within the root-level object that includes the plurality of service-specific investigative query objects, and the plurality of service-specific investigative query objects are digitally mapped to the alert name of the security alert by being programmatically accessible through the root-level object that includes the alert name of the security alert.

6. The computer-implemented method according to claim 1, wherein:

the subscriber-specific investigative queries file is structured according to a first hierarchical data schema, the service-specific investigative queries file is structured according to a second hierarchical data schema, and the first hierarchical data schema is different than the second hierarchical data schema.

7. The computer-implemented method according to claim 1, wherein:

the first plurality of computer-executable investigation queries are operably configured to investigate a first distinct security investigation question, a first subset of the corpus of investigation findings data includes investigation findings data that answers the first distinct security investigation question, the computer-implemented method further includes:

automatically generating a first data table that includes the investigation findings data of the first subset that answers the first distinct security investigation question, and automatically generating a first user interface (UI) tile that includes the first distinct security investigation question and the first data table, wherein the first data table is positioned below the first distinct security investigation question within the first UI tile, and displaying, via the graphical user interface, the security alert in association with the corpus of investigation findings data includes displaying the first UI tile on the graphical user interface.

8. The computer-implemented method according to claim 7, wherein:

the second plurality of computer-executable investigation queries are operably configured to investigate a second distinct security investigation question, a second subset of the corpus of investigation findings data includes investigation findings data that answers the second distinct security investigation question, the computer-implemented method further includes:

automatically generating a second data table that includes the investigation findings data of the second subset that answers the second distinct security investigation question, and automatically generating a second UI tile that includes the second distinct security investigation question and the second data table, wherein the second data table is positioned below the second distinct security investigation question within the second UI tile, and displaying, via the graphical user interface, the security alert in association with the corpus of investigation findings data further includes displaying the second UI tile on the graphical user interface.

9. The computer-implemented method according to claim 1, further comprising:

detecting the security alert corresponds to the security threat, and in response to detecting the security alert corresponds to the security threat, executing, in real time, a threat mitigation action that mitigates the security threat for the subscriber.

10. The computer-implemented method according to claim 1, wherein:

the digital asset includes an endpoint of the subscriber, the digital activity relates to a process running on the endpoint of the subscriber, the security alert does not include any metadata indicating whether the process running on the endpoint initiated any domain name system (DNS) queries, at least one of the first plurality of computer-executable investigation queries or the second plurality of computer-executable investigation queries is operably configured to answer a DNS-related security investigation question, a subset of the corpus of investigation findings data includes a set of DNS queries that were initiated by the process running on the endpoint of the subscriber, and the computer-implemented method further includes:

automatically generating a user interface (UI) component that includes the DNS-related security investigation question and the set of DNS queries that were initiated by the process running the endpoint of the subscriber, wherein:

the DNS-related security investigation question is positioned above the set of DNS queries within the UI component, and displaying the security alert in association with the corpus of investigation findings data on the graphical user interface includes displaying the UI component in association with the security alert on the graphical user interface.

11. The computer-implemented method according to claim 10, further comprising:

detecting that the set of DNS queries initiated by the process includes at least one DNS query to a malicious domain; and in response to detecting the process initiated the at least one DNS query to the malicious domain, terminating, in real-time, the process running on the endpoint of the subscriber.

12. The computer-implemented method according to claim 1, further comprising:

detecting the security alert corresponds to the benign security alert in response to assessing the security alert in association with the corpus of investigation findings data;

receiving, via the graphical user interface, an input selecting a close alert button displayed on the graphical user interface; and in response receiving the input selecting the close alert button displayed on the graphical user interface, automatically closing, in real-time, the security alert, wherein automatically closing the security alert includes:

automatically attributing, in real-time, a benign alert tag to the security alert, and automatically routing the security alert from a pending security alert queue to a security alert disposal queue, wherein each security alert included in the pending security alert queue is awaiting an alert triage.

13. The computer-implemented method according to claim 1, wherein:

the first plurality of computer-executable investigation queries and the second plurality of computer-executable investigation queries are simultaneously executed, executing one of the first plurality of computer-executable investigation queries includes:

creating a first application programming interface (API) call operably configured to retrieve a first set of investigation findings data from the third-party service;

creating a second API call operably configured to retrieve a second set of investigation findings data from a second third-party service different from the third-party service;

transmitting, over a computer network, the first API call to an API endpoint provided by the third-party service; and transmitting, over the computer network, the second API call to an API endpoint provided by the second third-party service, executing one of the second plurality of computer-executable investigation queries includes:

creating a third API call operably configured to retrieve a third set of investigation findings data from the third-party service; and transmitting, over the computer network, the third API call to the API endpoint provided by the third-party service, and the corpus of investigation findings data includes the first set of investigation findings data, the second set of investigation findings data, and the third set of investigation findings data.

14. The computer-implemented method according to claim 1, wherein:

automatically constructing a respective computer-executable investigation query of the first plurality of computer-executable investigation queries includes:

extracting, from the subscriber-specific investigative queries file, a plugin attribute specifying a target third-party service and a version of the target third-party service on which the respective computer-executable investigation query is to be executed;

extracting, from the subscriber-specific investigative queries file, a capability attribute specifying a type of query operation to be executed by the target third-party service;

extracting, from the subscriber-specific investigative queries file, a start time value specifying a first amount of time, extracting, from the subscriber-specific investigative queries file, an end time value specifying a second amount of time, obtaining a target subscriber-specific investigative query object of the plurality of subscriber-specific investigative query objects extracted from the subscriber-specific investigative queries file, wherein the target subscriber-specific investigative query object includes a query template that includes a plurality of evidence data fields and a plurality of fixed tokens;

converting the query template to an alert-specific query by automatically populating each evidence data field of the plurality of evidence data fields with a respective piece of evidence data included in the first subset of evidence data;

creating, based on application programming interface (API) protocols specified by the target third-party service, an API call that includes:

a representation of the plugin attribute, a representation of the capability attribute, the alert-specific query, and a query time range determined based on the start time value and the end time value.

15. The computer-implemented method according to claim 14, wherein:

executing the first plurality of computer-executable investigation queries includes transmitting, over a computer network, the API call to an API endpoint provided by the target third-party service, the target third-party service is different from the third-party service that detected the digital activity, and the computer-implemented method further includes:

in response to transmitting the API call to the API endpoint provided by the target third-party service, obtaining a subset of the corpus of investigation findings data, wherein the subset of the corpus of investigation findings data includes:

a first set of raw logs retrieved from the target third-party service that occurred before the security alert was generated, and a second set of raw logs retrieved from the target third-party service that occurred after the security alert was generated.

16. The computer-implemented method according to claim 1, wherein:

automatically constructing a respective computer-executable investigation query of the second plurality of computer-executable investigation queries includes:

extracting, from the service-specific investigative queries file, a plugin attribute specifying the third-party service and a version of the third-party service on which the respective computer-executable investigation query is to be executed;

extracting, from the service-specific investigative queries file, a capability attribute specifying a type of query operation to be executed by the third-party service;

extracting, from the service-specific investigative queries file, a start time value specifying a first amount of time, extracting, from the service-specific investigative queries file, an end time value specifying a second amount of time, obtaining a target service-specific investigative query object of the plurality of service-specific investigative query objects extracted from the service-specific investigative queries file, wherein the target service-specific investigative query object includes an query template that includes a plurality of evidence data fields and a plurality of fixed tokens;

converting the query template to an alert-specific query by automatically populating each evidence data field of the plurality of evidence data fields with a respective piece of evidence data included in the second subset of evidence data; and creating, based on application programming interface (API) protocols specified by the third-party service, an API call that includes:

a representation of the plugin attribute, a representation of the capability attribute, the alert-specific query, and a query time range determined based on the start time value and the end time value.

17. The computer-implemented method according to claim 16, wherein:

executing the second plurality of computer-executable investigation queries includes transmitting, over a computer network, the API call to an API endpoint provided by the third-party service, and the computer-implemented method further includes:

in response to transmitting the API call to the API endpoint provided by the third-party service, obtaining a subset of the corpus of investigation findings data, wherein the subset of the corpus of investigation findings data includes:

a first set of raw logs retrieved from the third-party service that occurred before the security alert was generated, and a second set of raw logs retrieved from the third-party service that occurred after the security alert was generated.

18. The computer-implemented method according to claim 1, wherein:

the subscriber-specific investigative queries file is a first Yet Another Markup Language (YAML) file, and the service-specific investigative queries file is a second YAML file.

19. A method comprising:

generating a security alert for a subscriber in response to assessing digital activity that occurred on a digital asset of the subscriber;

executing an automated investigation protocol for the security alert in response to providing, as input, the security alert to the automated investigation protocol, wherein executing the automated investigation protocol includes:

automatically extracting, from the security alert, an alert identifier of the security alert, a name of a third-party service that detected the digital activity, and a globally unique identifier (GUID) that corresponds to the subscriber;

automatically detecting that (i) a first directory path comprising the GUID exists within a hierarchical file system and (ii) a second directory path comprising the name of the third-party service exists within the hierarchical file system;

in response to detecting the first directory path and the second directory path exist within the hierarchical file system, automatically loading, into memory, a subscriber-specific investigative queries file located within the first directory path and a service-specific investigative queries file located within the second directory path;

automatically extracting, from the subscriber-specific investigative queries file loaded into the memory, a plurality of subscriber-specific investigative query objects digitally mapped to the alert identifier corresponding to the security alert;

in response to extracting the plurality of subscriber-specific investigative query objects, automatically constructing a first plurality of computer-executable investigation queries using the plurality of subscriber-specific investigative query objects and a first subset of evidence data included in the security alert;

automatically extracting, from the service-specific investigative queries file loaded into the memory, a plurality of service-specific investigative query objects digitally mapped to an alert-agnostic text string;

in response to extracting the plurality of service-specific investigative query objects, automatically constructing a second plurality of computer-executable investigation queries using the plurality of service-specific investigative query objects and a second subset of evidence data included in the security alert; and obtaining, in response to executing the first plurality of computer-executable investigation queries and the second plurality of computer-executable investigation queries, a corpus of investigation findings data indicative of whether the security alert corresponds to a security threat or a benign security alert; and displaying, via a graphical user interface, the security alert in association with the corpus of investigation findings data.

20. The method according to claim 19, wherein:

the service-specific investigative queries file includes:

a root-level object that includes the alert-agnostic text string, and a nested object within the root-level object that includes the plurality of service-specific investigative query objects, the root-level object that includes the alert-agnostic text string includes all service-specific investigative query objects useable for any security alert having at least one piece of alert metadata referencing the third-party service, the plurality of service-specific investigative query objects are digitally mapped to the alert-agnostic text string by being programmatically accessible through the root-level object that includes the alert-agnostic text string, and the alert-agnostic text string has only three characters.

* * * * *